US008317510B2

(12) United States Patent
Atreya

(10) Patent No.: US 8,317,510 B2
(45) Date of Patent: Nov. 27, 2012

(54) METHOD OF WASTE HEAT RECOVERY FROM HIGH TEMPERATURE FURNACE EXHAUST GASES

(75) Inventor: Arvind Atreya, Ann Arbor, MI (US)

(73) Assignee: The Regents Of The University of Michigan, Ann Arbor, MI (US)

( * ) Notice: Subject to any disclaimer, the term of this patent is extended or adjusted under 35 U.S.C. 154(b) by 931 days.

(21) Appl. No.: 11/776,883

(22) Filed: Jul. 12, 2007

(65) Prior Publication Data

US 2008/0014537 A1    Jan. 17, 2008

Related U.S. Application Data

(60) Provisional application No. 60/830,730, filed on Jul. 13, 2006.

(51) Int. Cl.
*F23C 9/00* (2006.01)

(52) U.S. Cl. .............................. 431/5; 431/115; 431/161

(58) Field of Classification Search .............. 431/9, 115, 431/36, 161, 207, 11; 432/5; 110/208
See application file for complete search history.

(56) References Cited

U.S. PATENT DOCUMENTS

| 4,511,434 A | * | 4/1985 | Vasalos ............................ 202/99 |
| 4,800,866 A | * | 1/1989 | Finke .......................... 126/91 A |
| 4,995,807 A | * | 2/1991 | Rampley et al. .................... 431/9 |
| 5,092,761 A | * | 3/1992 | Dinicolantonio ............. 431/115 |
| 5,511,971 A | * | 4/1996 | Benz et al. ........................ 431/9 |
| 5,833,450 A |   | 11/1998 | Wunning |
| 6,190,159 B1 | * | 2/2001 | Moore et al. ..................... 431/11 |
| 6,247,917 B1 | * | 6/2001 | Berger et al. ...................... 431/9 |
| 6,764,304 B2 | * | 7/2004 | Atreya ............................... 432/5 |
| 6,869,277 B2 |   | 3/2005 | Stephens |
| 6,890,172 B2 |   | 5/2005 | Stephens et al. |
| 6,910,878 B2 | * | 6/2005 | Leger ................................ 431/4 |
| 7,062,912 B2 |   | 6/2006 | Penfornis et al. |
| 7,104,787 B2 | * | 9/2006 | Collier .......................... 431/215 |
| 7,322,818 B2 | * | 1/2008 | Stephens et al. ................. 431/9 |

(Continued)

FOREIGN PATENT DOCUMENTS

EP          776961 A1 *    6/1997

OTHER PUBLICATIONS

Dowling et al, Similarity of the concentration field of gas-phase turbulent jets (1990) J. Fluid Mech. vol. 218 pp. 109-141.*

(Continued)

*Primary Examiner* — Alfred Basichas
(74) *Attorney, Agent, or Firm* — Harness, Dickey & Pierce, P.L.C.

(57) ABSTRACT

The disclosure provides methods and systems for recovering thermal energy from heated exhaust gases. The methods and systems have particular use in conjunction with combustion source effluent/exhaust streams. The methods of energy recovery increase life expectancy of various equipment, while reducing operating and maintenance costs for economic recovery of enthalpy from heated process streams. In certain aspects, the methods of recovering thermal energy include providing a heated low pressure effluent stream. A high velocity stream is injected into an entrainment zone to form a high velocity jet which entrains the heated effluent stream. The momentum of the system is conserved and a mixed stream is pressurized and recirculated to a burning zone of a combustion source. The methods also reduce pollutant emissions.

23 Claims, 10 Drawing Sheets

U.S. PATENT DOCUMENTS

2005/0014102 A1 1/2005 Harbeck
2005/0271990 A1* 12/2005 Lifshits .................... 431/116

OTHER PUBLICATIONS

"Combustion Project Fact Sheet: NOx Emission Reduction by Oscillating Combustion," U.S. Department of Energy, Office of Industrial Technologies (1999).
"Steel: Dilute Oxygen Combustion (DOC) System," U.S. Dept. of Energy, Office of Industrial Technologies, (2001).
Atreya, A. et al., "High Temperature Furnace Based on Radiative Homogeneous Combustion for Improved Efficiency and Reduced Emissions," TMS 2006 Annual Meeting, San Antonio, TX, pp. 1-37 (Mar. 12-16, 2006).
Atreya, A., "Oxy-Fuel Combustion," 2006 IAC Directors Meeting, Washington, D.C., pp. 1-21 (Jul. 31-Aug. 1, 2006).
Broadwell, J. E. et al., "A Simple Model of Mixing and Chemical Reaction in a Turbulent Shear Layer," J. Fluid Mech., vol. 125, pp. 397-410 (1982).
Broadwell, J.E. et al., "A Turbulent Jet Chemical Reaction Model: NOx Production in Jet Flames," Combust. and Flame, vol. 114, pp. 319-335 (1998).
Dahm, W.J.A. et al., "Measurements of Entrainment and Mixing in Turbulent Jets," AIAA J., vol. 25, pp. 1216-1223 (1987).
Dimotakis, P., "Turbulent Mixing," Annu. Rev. Fluid. Mech., vol. 37, pp. 329-356 (2005).
Dowling, D. R. et al., "Similarity of the Concentration Field of Gas-Phase Turbulent Jets," J. Fluid Mech., vol. 218, pp. 109-141 (1990).
Han, D. et al., "Direct Measurement of Entrainment in Reacting/Nonreacting Turbulent Jets," Combust. and Flame, vol. 124, pp. 370-386 (2001).
Hill, B.J., "Measurement of Local Entrainment Rate in the Initial Region of Axisymmetric Turbulent Air Jets," J. Fluid Mech., vol. 51, Part 4, pp. 773-779 (1972).
Hill, J.C., "Homogeneous Turbulent Mixing With Chemical Reaction," Annu. Rev. Fluid Mech., vol. 8, pp. 135-161 (1976).
Muniz, L. et al., "Effects of Heat Release and Buoyancy on Flow Structure and Entrainment in Turbulent Nonpremixed Flames," Combust. and Flame, vol. 126, pp. 1402-1420 (2001).
Ricou, F. P. et al., "Measurements of Entrainment by Axisymmetrical Turbulent Jets," J. Fluid Mech., vol. 11, pp. 21-31 (1961).
Riley, M. F. et al., "Praxair's Dilute Oxygen Combustion Technology for Pyrometallurgical Applications," JOM, pp. 21-24 (2001).
Shin, S.J. et al., "A Study of Dilution and Mixing of Unconfined Multiple Turbulent Jets for Industrial Furnaces," 5th U.S. Combustion Meeting, Paper No. B20, University of California at San Diego, pp. 1-20 (Mar. 25-28, 2007).
A. Atreya, et al., "A Novel Method of Waste Heat Recovery from High Temperature Furnaces to Create Radiative Flameless Combustion," retrieved from http://content.lib.utah.edu/cgi-bin/showfile.exe?CISOROOT=/ir-admin2&CISOPTR=21386&filename=21103, 9 pp. (downloaded on Nov. 22, 2011).
W. Budzianowski, et al., "Towards Improvements in Thermal Efficiency and Reduced Harmful Emissions of Combustion Processes by Using Recirculation of Heat and Mass: A Review," Recent Patents on Mechanical Engineering, vol. 2, pp. 228-239 (2009).

* cited by examiner

METHOD OF WASTE HEAT RECOVERY FROM HIGH TEMPERATURE FURNACE EXHAUST GASES

CROSS-REFERENCE TO RELATED APPLICATIONS

This application claims the benefit of U.S. Provisional Application No. 60/830,730 filed on Jul. 13, 2006. The disclosure of the above application is incorporated herein by reference in its entirety.

FIELD

The present disclosure relates to methods and systems for recovering thermal energy and more particularly to systems and methods to economically recover and reuse enthalpy lost in exhaust gases from various industrial combustion sources.

BACKGROUND

The statements in this section merely provide background information related to the present disclosure and may not constitute prior art.

Various industrial processes employ high-temperature processing. Most often these processes burn fuels, such as non-renewable fossil-fuels, to achieve the requisite high processing temperatures. Such processes include power plants, metal manufacturers (e.g., aluminum, iron, and steel), glass manufacturers, and cement manufacturers, among others. However, such processes often have low recovery efficiencies and high heat losses. For example, it has been estimated that various high temperature energy intensive processes that employ combustion sources for heat, such as steel, glass, aluminum, and the like, use about 12 quads of energy (1 quad=$10^{15}$ BTUs or 1.05 Exajoules). Further, it is estimated that only 40% of this energy is used and 60% is lost. While various types of heat-recovery equipment are used in conjunction with exhaust and effluent streams, such as various heat exchange technologies, in practice, this equipment often has low efficiency, hence significant heat losses, as well as potentially large capital, operating, and maintenance costs. Thus, it is desirable to develop new technology that improves energy efficiency by economically capturing a greater portion of the waste heat from various industrial processes to increase operating efficiency, reduce non-renewable resource consumption, reduce pollution, and to enhance operation of the underlying process.

Further areas of applicability will become apparent from the description provided herein. It should be understood that the description and specific examples are intended for purposes of illustration only and are not intended to limit the scope of the present disclosure.

SUMMARY

In various aspects, the present disclosure provides methods and systems for recovering enthalpy from a combustion source. In certain aspects, a method comprises entraining at least a portion of a heated effluent stream in a high velocity jet stream to form a mixed stream. The heated effluent stream is created by reacting oxygen and a fuel in a reaction zone of the combustion source. Further, the high velocity jet comprises oxygen or fuel. The mixed stream is pressurized and introduced into the reaction zone to recirculate at least a portion of the heated effluent stream, thereby recovering at least a portion of the enthalpy from the heated effluent stream.

In certain aspects, the present disclosure provides a method of improving energy efficiency of a combustion source, where the method comprises entraining a heated effluent stream formed in a combustion reaction zone in a high velocity oxygen-containing jet to form a pressurized mixed stream. At least a portion of the mixed stream is returned to the combustion reaction zone. In certain aspects, the high velocity oxygen-containing jet comprises substantially pure oxygen.

In yet another aspect of the disclosure, a method of recovering thermal energy comprises providing a process effluent stream having a first temperature and a first pressure. The process effluent stream is formed in a combustion source. A high velocity jet is created in a device downstream from and in fluid communication with the combustion chamber. The high velocity jet entrains a portion of the process effluent stream into the high velocity jet to form a mixed stream. At least a portion of the mixed stream is passed through a collection duct that increases pressure of the mixed stream, so that the mixed stream has a second temperature and a second pressure and is delivered to the combustion source. In certain aspects, the collection duct is venturi-shaped. The first temperature is greater than the second temperature. Further, in certain aspects, the temperature is at least about 500° F. (about 260° C.), and the second pressure is at least five times that of the first pressure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
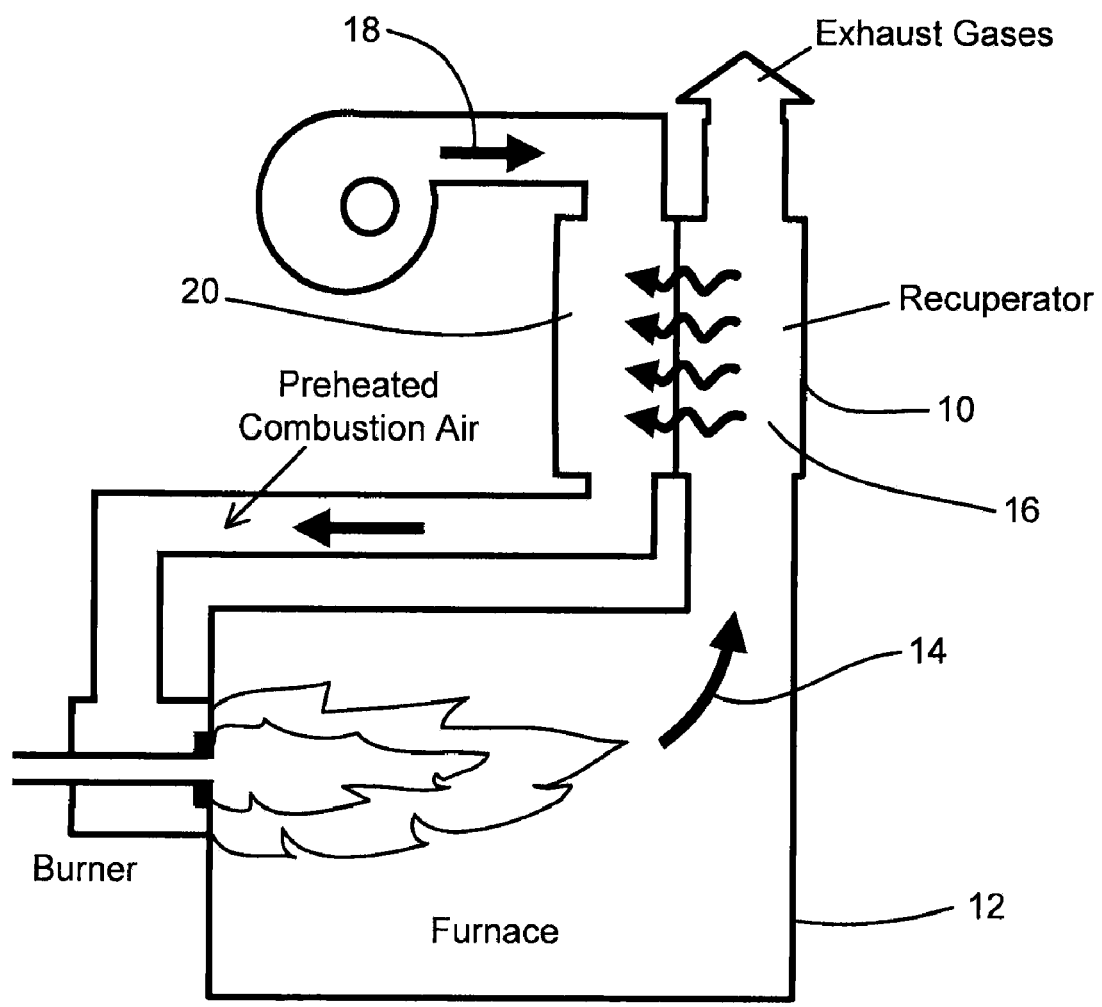
FIG. 1 is an exemplary schematic of a conventional heat exchange recuperator system used in conjunction with a typical combustion furnace for heat recovery.

The following description is merely exemplary in nature and is not intended to limit the present disclosure, application, or uses. It should be understood that throughout the drawings, corresponding reference numerals indicate like or corresponding parts and features.

In various aspects, the disclosure provides a method of improving energy efficiency of various high-temperature energy intensive processes that employ combustion for heating. In various aspects, the methods of the disclosure provide methods of recovering thermal energy (i.e., enthalpy) from a high temperature process stream. While the term "high temperature" can encompass a range of temperatures well known to those of skill in the art, it is generally intended in the present disclosure to mean a process stream having a temperature greater than ambient, optionally greater than or equal to about 500° F. (about 260° C.), optionally greater than or equal to about 750° F. (about 400° C.), optionally greater than or equal to about 1,000° F. (about 540° C.), optionally greater than or equal to about 1,250° F. (about 680° C.), optionally greater than or equal to about 1,500° F. (about 815° C.), optionally greater than or equal to about 1,750° F. (about 955° C.); optionally greater than or equal to about 2,000° F. (about 1095° C.); and in some aspects, temperatures equal to or in excess of 2,500° F. (about 1230° C.).

The processes and systems described herein can be used in conjunction with any industrial process that requires recovery of thermal energy from a high temperature process stream. The methods and devices of the present disclosure are particularly useful in high temperature process streams found in a variety of industrial processes that traditionally employ combustion sources, such as boilers, furnaces, or other direct-fire processes, including by way of example, the following non-limiting industries: metal manufacturers and processors, cement manufacturers, glass manufacturers, various power generating boilers and other furnaces, including incinerators. Various principles of the disclosure can be used for any type of combustion sources, including for 100% oxygen furnaces, as well as for batch and continuous processes.

Current approaches for improving combustion source energy efficiency include using the excess energy from the flue gas to preheat the combustion air using recuperators or regenerators. Recuperators transfer some of the heat from the flue gas to the combustion air in a heat exchanger, while regenerators accumulate a portion of the heat from the flue gas in a ceramic or refractory material for later preheating of the combustion air. By way of illustration, FIG. 1 shows an exemplary heat recovery system including a recuperator 10. A combustion reaction between fuel and an oxidant occurs in a combustion source 12 (here a furnace) to generate a heated effluent or flue gas 14. The heated effluent stream 14 enters a first side 16 of the recuperator 10. Heat is transferred from the effluent stream 14 to an incoming oxidant stream 18 passing through a second side 20 in the recuperator 10. The oxidant stream 18 is thus pre-heated and then used for the combustion reaction in the furnace 12.

However, significant limitations are attendant with such conventional heat recovery systems. Specifically, both recuperators and regenerators rely upon the transfer of energy through an additional medium. For example, in recuperators, the high temperature stream (e.g., 16) and low temperature stream (e.g., 18) are separated by one or more materials, for example by metal or ceramic fins, plates, and the like, through which the heat is transferred. Similarly, regenerators transfer energy from a high temperature stream to storage media. Subsequently, a lower temperature stream is passed over the storage media thereby transferring heat. Thus, the transfer between several distinct material phases introduces inefficiencies, diminishing the amount of heat actually transferred.

Secondly, due to temperature limitations of the materials from which a recuperator is constructed, effluent and process streams usually must be cooled significantly (by mixing with ambient air) prior to entering recuperators. Thus, such recovery devices inherently have a significant energy loss due to required cooling steps. Furthermore, only oxygen or air (combustion oxidant stream) can be pre-heated via recuperators or regenerators, because in the case of fuel streams, the material transfer surfaces provide a locus for fuels and other materials to deposit and foul or scale the surface. For example, hydrocarbon fuels have been observed to undergo pyrolysis and rapidly form layers of soot on the material transfer surfaces, making it impractical to heat streams containing fuels via these recovery devices.

Other methods of recovering thermal energy include cogeneration of power and heat by production of electricity and/or steam. The disadvantage of all of these approaches is a relatively low energy recovery (e.g., low efficiency), as well as significant capital investment and operating costs, which often tend to outweigh any economic benefits realized by such heat recovery strategies.

Furthermore, flue gases or effluent process streams generated in a reaction of oxygen and fuel in a combustion reaction typically have high levels of particulates, water vapor and/or condensable and/or condensed batch vapors. Hence, flue gases are also typically treated by pollution abatement systems in order to comply with the applicable environmental regulations. Since such pollution abatement systems, such as electrostatic precipitator or baghouses, can only be operated at a temperature of about 750° F. (about 400° C.) or below, it is necessary to further cool such flue gases before entering these systems for processing. Thus, additional energy losses are often observed with systems having pollution abatement equipment.

Figure 2:
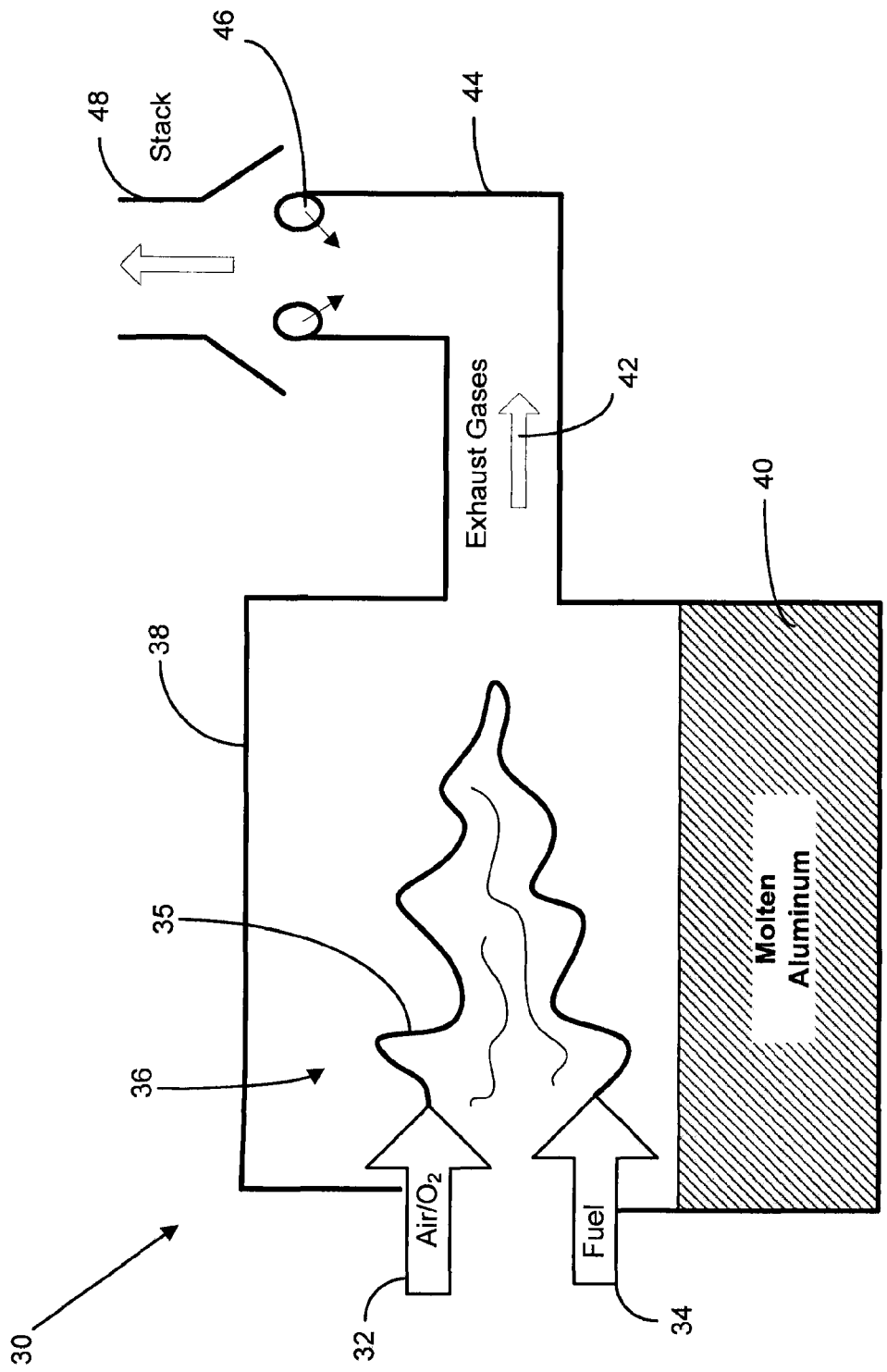
FIG. 2 is a typical combustion source having an air damper arrangement for cooling hot flue gases.

Cooling the hot flue gas before treatment at the abatement system or prior to entry into a recuperator and/or regenerator is often done by diluting the hot flue gas with significant quantities of ambient air. As air dilution increases, the amount of flue gas to be treated requires larger abatement systems and higher operating costs. In one simplified example shown in FIG. 2, a molten aluminum furnace 30 (i.e., a combustion source) where combustion occurs is shown. Air 32 and fuel 34 are reacted to generate a flame 35 in a reaction zone 36 of a reactor chamber 38 the furnace 30. The flame 35 heats material 40 (such as aluminum) in the furnace 30 to create molten aluminum. After reaction in the reactor chamber 38 an exhaust or flue gas 42 exits the reaction chamber 38 into outlet duct work 44, where it is exposed to a damper 46 that injects compressed or ambient air to the exhaust or effluent stream 42 to reduce the temperature of the gas, which then exits via a stack 48. While not shown, the cooled exhaust gas 42 can be introduced to a recuperator or regenerator prior to entering the stack 48 (such as the one depicted in FIG. 1, for example). Such a configuration may also include various other damper and draft induction systems that mix ambient temperature gas streams with the high temperature exhaust gases. Similarly, while not shown, hot flue gas can be cooled by spraying with water. However, water spraying can exacerbate corrosion issues in the exhaust duct work, which it contacts. Such corrosion can be detrimental to various downstream equipment, shortening the lifespan of such equipment and increasing operating and maintenance costs.

As discussed above, it has been estimated that over 60% of the 12 quads of energy used in high-temperature combustion sources annually in the United States (notwithstanding global usage) is wasted due to system inefficiency. Current methods of recovering enthalpy from process streams created by these combustion streams are estimated to only realize 5 to 30% of the enthalpy contained therein, including recovery by recuperators and regenerators.

Figure 3:
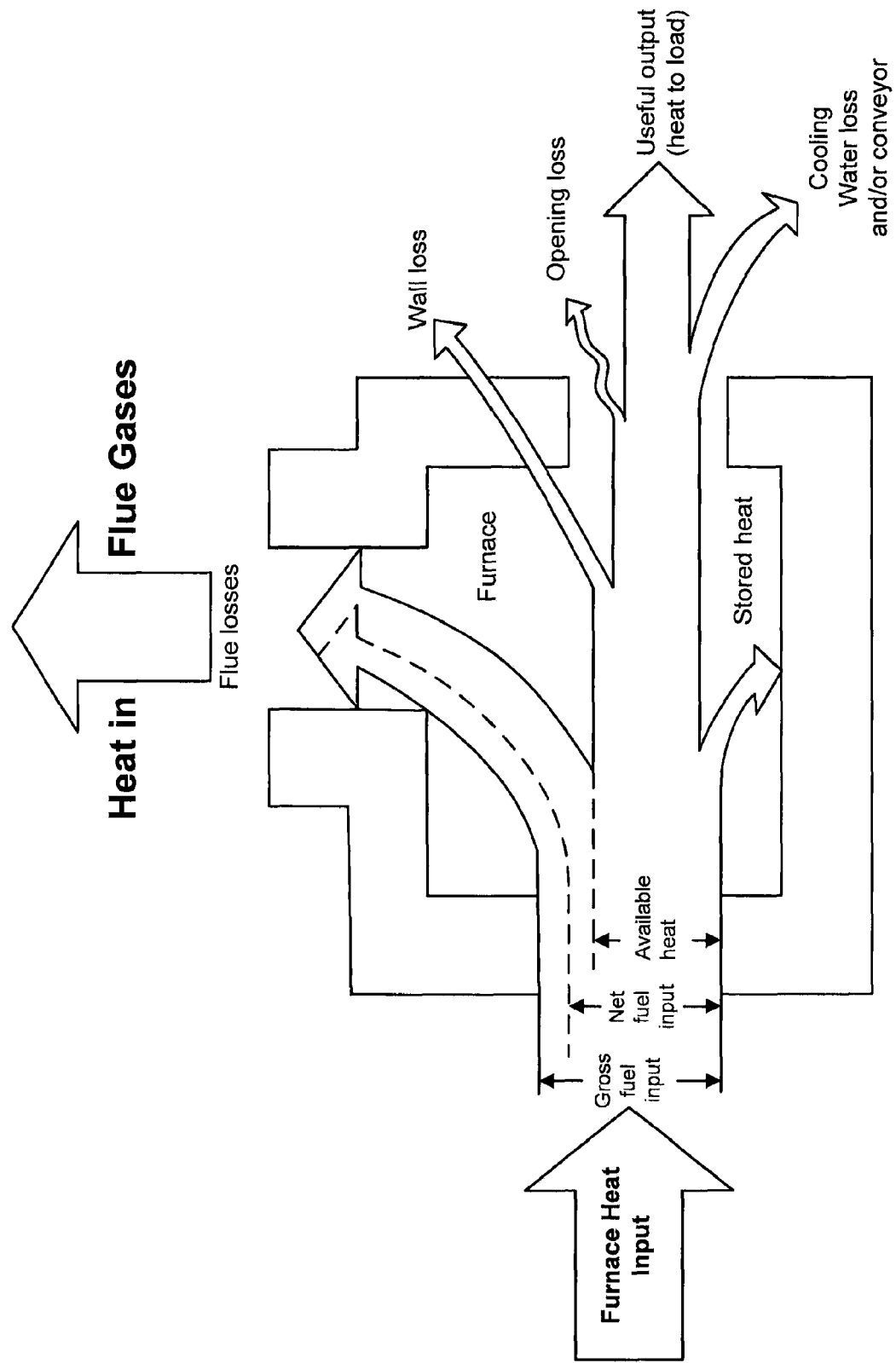
FIG. 3 is an energy balance diagram for an exemplary combustion furnace system.

An estimated energy balance of an exemplary furnace is shown in FIG. 3. In a typical furnace, the largest heat loss occurs in the flue gas enthalpy. Flue gas heat (e.g., enthalpy) loss can be calculated by the following: Heat Loss=$W \times C_p \times (T_{exhaust} - T_{ambient})$, where W is the mass or volume of exhaust gas, $C_p$ is the average heat capacity of the exhaust gas, $T_{exhaust}$ is the exhaust gas temperature, and $T_{ambient}$ is ambient temperature. For example, where the effluent stream/flue gas is at 1,500° F. (about 815° C.), the flue gas energy loss based on energy input to the system is about 50%. The energy loss goes up as the flue gas temperature is raised, for example, it is estimated that the effluent gas temperature is about 2,000° F. (about 1090° C.) and fuel and oxidant are fed at stoichiometric ratios in the furnace, where the amount of enthalpy lost in the effluent stream is about 55%. If 20% excess air is employed, then the enthalpy lost is over 60% when the flue gas temperature is at about 2,000° F. (about 1090° C.). As can be seen in FIG. 3, only a small portion of the heat input to the furnace, generally on the order of 20 to 40%, is actually transferred to the product. Thus, methods and systems that increase the energy efficiency of such combustion systems through thermal energy or enthalpy recovery are important to not only reducing energy consumption, but also for reducing pollution and global warming.

In accordance with the present disclosure, such improved methods and systems will decrease oxygen and/or fuel requirements, while more efficiently recovering enthalpy and overall energy. Additionally, various systems and methods according to the present teachings are relatively easy to implement, requiring a relatively low capital expenditure to achieve superior heat recovery with concurrent reduced operating costs compared to conventional systems.

The methods and systems of the present disclosure provide one or more of the following benefits: (i) a relatively simple design and process to achieve heat recovery; (ii) the ability to economically capture greater than about 50% of the energy conventionally lost via exhaust gases from combustion sources, (iii) a long trouble-free operational life of the heat recovery device at a significantly reduced installation cost, (iv) a method to control and reduce pollutant emissions (such as CO and $NO_x$) produced by a combustion source, (v) increased productivity of furnaces via improved gas radiation in the reaction zone, (vi) profitable implementation with existing high temperature recuperators/regenerators, (vii) profitable use with furnaces that use substantially pure (~100%) oxygen furnaces, (viii) use with either batch and continuous furnaces and (ix) optional use with systems that generate volatile organic compounds to derive fuel value from these by-product emissions via recycling and combustion.

Figure 4:
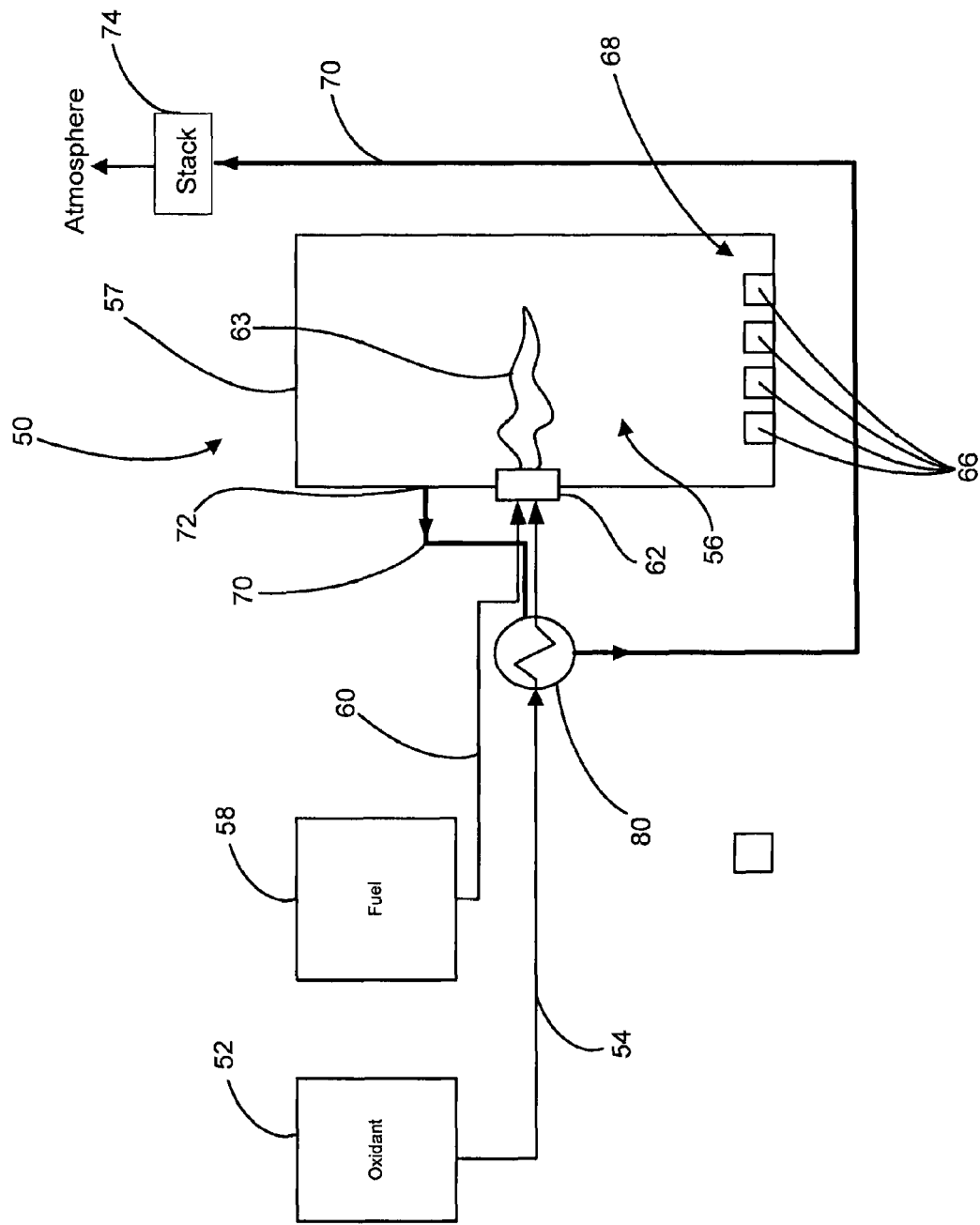
FIG. 4 is an exemplary combustion source having heated effluent.

As shown in FIG. 4, a conventional combustion source 50 is schematically illustrated. Examples of various combustion sources include combustion burners (for example, process burners to heat metals, glass, ceramics, and the like), ovens (for example, industrial ovens like paint-coating facilities), kilns, boilers, incinerators and the like. In various aspects, the teachings in accordance with the present disclosure are capable of being retro-fitted into existing combustion source systems. However, various embodiments of the present disclosure may be integrated into a new combustion source system and may be integrated into the furnace itself. In the case of retrofitting an energy recovery system, physical space may be limited, thus the present disclosure provides energy recovery systems that are physically small and inexpensive and are particularly beneficial for retrofitting with an existing installation and integrated with existing equipment. In various aspects, the heat recovery methods and system have enhanced performance and improved economics for recovering heat from exhaust gases, while accounting for physical and operational constraints. Furthermore, the present systems can be employed with existing heat recovery equipment and pollution abatement equipment, as described in more detail below.

By way of further background, an exemplary combustion source is contained in FIG. 4. A source of oxygen 52, for example, air or pure oxygen, provides an oxygen-containing oxidant stream 54, which is delivered to a reaction zone 56 in a reaction chamber 57. Similarly, a fuel source 58 contains a fuel, such as a hydrocarbon fuel, for example, pulverized coal, natural gas, methanol, and other fuels well known to those of skill in the art, which is delivered via a fuel stream 60 to the reaction zone 56. As used herein, the term "reaction zone" refers to the region of the combustion source including premixing chambers (when present), burner pipes, burners, and the region where combustion occurs in the reaction chamber 57. The oxygen-containing first stream 54 and the fuel-containing second stream 60 are mixed in the reaction zone 56 at an injector on burner 62 to react and release significant thermal energy. In the exemplary combustion source 50 shown, a flame 63 is formed and the heat generated by the flame 63 is transferred to a plurality of metal ingots 66 provided in the lower portion 68 of the reaction chamber 57. The ingots 66 are heated and/or melted for working/processing.

An effluent process gas stream 70 containing exhaust gas or so-called flue gas created in the reaction zone 56 exits the reaction chamber 57 via an outlet 72. A pressure of the exhaust gas/flue gas stream 70 as it exits the reactor chamber 56 is usually less than the pressure of the oxidant containing first stream 54 as it enters the burner 62. Usually the reactor chamber 57 of the furnace 50 has a pressure close to atmospheric pressure so that air does not leak into the furnace 50 and furnace gases do not leak out, thus the stream 70 exiting the reaction zone 56 at outlet 72 is usually maintained near atmospheric pressure. A pressure of the first stream 54 is relatively high (depending on the burner) as compared to the exhaust stream 70 because it is injected as the oxidant into the burner 62 of the furnace 50.

In certain aspects, the pressure of the exhaust stream 70 is less than 25%, optionally less than 20%, and in some aspects less than 10% of the pressure of the incoming oxidant-containing first stream 54. In one example, the exhaust gas stream 70 at the outlet 72 may be less than or equal to about 1 inch water column (for example, ±1 inches w.c. (about 250 Pa)). The oxygen-containing first stream 54 optionally has a pressure of greater than or equal to about 20 inches w.c. (about 5 kPa) as it enters the burner 62 of the reaction chamber 57. As appreciated by those of skill in the art, these pressures are dependent upon various parameters and conditions, including, fuel type, reaction chamber, heat, fuel injector, nozzle, and flame profile design, inter alia. In this regard, conventionally the high-temperature effluent stream 70 has not been recirculated/recycled directly back into the reaction chamber 57, as it must be pressurized to the desired level prior to entering the burner 62 for effective combustion. Previous issues with recycling the flue gas (high-temperature effluent stream 70) directly to the reaction chamber 57 included high capital and operational costs associated with pressurization of a high-temperature high volumetric flow rate process stream (via high temperature blowers and the like), making such systems industrially impractical.

As shown in FIG. 4, a general heat exchanger 80, such as a recuperator, transfers heat from the exhaust gas stream 70 to the oxygen-containing first stream 54. After passing through the heat exchanger 80, the exhaust stream 70 exits via a stack or flue 74 and then is released to the atmosphere. While not shown, various other types of processing equipment, including air pollution control devices, dampers, fans, and blowers and the like are often used downstream of the heat exchanger 80. Further, in certain aspects, exhaust gas processing designs may not include heat exchangers such as 80 in FIG. 2. The heat recovery system in accordance with the disclosure enables transfer and recirculation of hot flue gases at relatively low pressures, for example, atmospheric pressure, into an oxygen-containing stream having significant pressures, for example, +20 inches water column (about 5 kPa).

Figure 5:
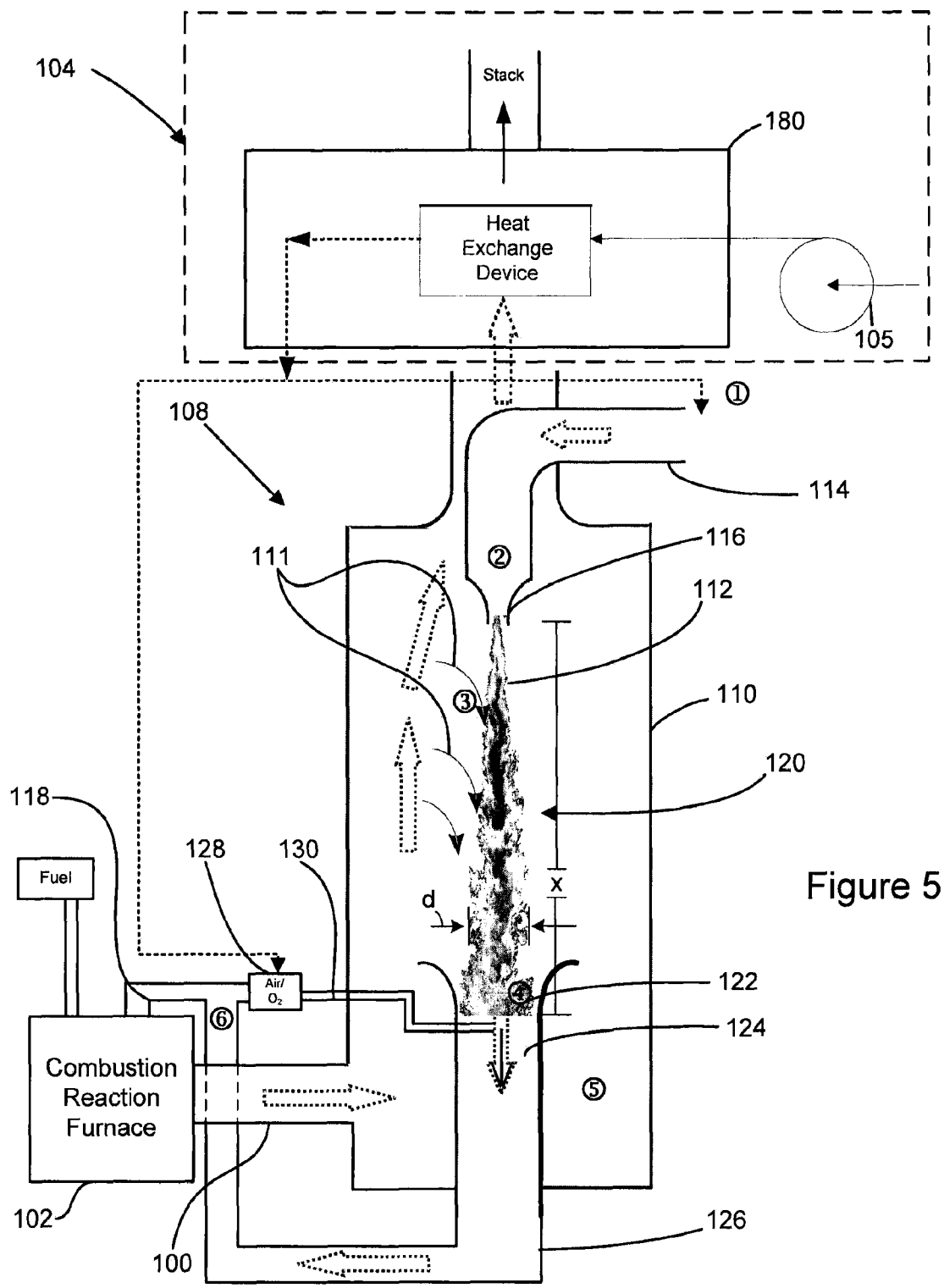
FIG. 5 is a schematic showing a combustion source with a heated exhaust gas and a vertical heat recovery system in accordance with one aspect of the principles of the disclosure, as well as an optional conventional recuperator for heat recovery.

In various aspects, the disclosure provides a method of recovering enthalpy or heat from a high temperature process, such as a high-temperature effluent stream 100 shown in FIG. 5. The system provides energy recovery from a combustion source (e.g., a reaction chamber 102), similar to the reaction zone 56 of the furnace 50 shown in FIG. 4. In FIG. 5, an additional conventional high-temperature heat exchange system 104 is optionally in heat transfer relationship with the combustion reaction furnace 102 effluent stream 100. By way of example, an exemplary heat exchange device 104 includes a heat exchange device 180, such as a recuperator, which is optionally present in the combustion source (indicated by the dotted line). If a recuperator or other conventional heat exchange device 180 is present, it can be integrated into the overall heat recovery system of the present disclosure to further improve energy recycling, as will be described in more detail below.

A heat recovery system 108 in accordance with the present teachings comprises a mixing chamber 110 downstream from and in fluid communication with the combustion reaction furnace 102. The effluent process stream 100 exits the combustion reaction furnace 102 at a first temperature and a first pressure. The temperature of the effluent stream 100 is relatively high, as described above, for example, is greater than or equal to about 500° F. (about 260° C.). As described above, the temperature of the effluent stream 100 is optionally greater than or equal to about 750° F. (about 400° C.), optionally greater than or equal to about 1,000° F. (about 540° C.), optionally greater than or equal to about 1,250° F. (about 680° C.), optionally greater than or equal to about 1,500° F. (about 815° C.), optionally greater than or equal to about 1,750° F. (about 955° C.); optionally greater than or equal to about 2,000° F. (about 1095° C.); or optionally greater than or equal to about 2,500° F. (about 1230° C.), depending on the process from which the effluent process stream 100 originates and the cooling effects along the process stream path.

The method of recovering the enthalpy from a high-temperature process stream, such as 100 shown in FIG. 5, comprises creating a high velocity jet 112 in a mixing chamber 110 disposed in a separate apparatus downstream of the furnace 102, by introducing a high pressure jet stream 114 into the chamber 110 via an injection nozzle 116. By "high-velocity" it is meant that the jet has a velocity of optionally greater than about 50 m/s, optionally greater than about 100 m/s, optionally greater than about 200 m/s; and in some aspects optionally greater than about 300 m/s. In certain aspects, the high-velocity jet stream 114 has a velocity of about 50 to about 350 m/s, for example, as it exits the injection nozzle 116 at the position labeled (3). In various aspects, the jet stream 114 is introduced to for example, injected into, the effluent stream 100. In certain non-limiting aspects, the effluent stream 100 may be flowing in a cross-current or counter-current direction. As shown in FIG. 5, the effluent stream 100 is flowing in a counter-current direction to the jet 112 direction. By virtue of employing a high-velocity jet 112 comprising jet stream 114, at least a portion of the high-temperature effluent process stream 100 is entrained in the jet 112, which will be discussed in more detail below. The jet stream 114 optionally comprises oxygen and/or air. The jet stream 114 thus provides additional oxygen and/or air, which can be pre-heated by direct mixing with the heated effluent process stream 100 via entrainment (arrows labeled 111).

The jet stream 114 has a temperature and a pressure, which differ from the first temperature and pressure of the process stream 100. In some aspects, the jet stream 114 may pass through the heat exchange system 104 prior to entering the jet stream passage 114 and injection nozzle 116, although in other aspects, where a heat exchanger 104 is not present, the jet stream 114 may be provided to the injection nozzle 116 at ambient temperatures. In embodiments where a heat exchange device 180 is present, in certain aspects, a blower or compressor 105 pressurizes the jet stream 114 prior to entry into the recuperator 104 (to avoid needless pressurizing of a heated stream). The temperature of the jet stream 114 as it enters the mixing chamber 110 at the injector nozzle 116 is less than the temperature of the effluent stream 100, for example, less than or equal to about 750° F. (about 400° C.), in some aspects, less than or equal to about 400° F. (about 200° C.) and in some aspects less than or equal to about 100° F. (about 40° C.).

The pressure of the jet stream 114 is high compared to the first pressure of the heated effluent stream 100. For example, the first pressure of the effluent stream 100 is similar to the pressure exiting the reaction furnace 102, for example, less than or equal to about 5 inches water column (about 1.25 kPa), optionally less than about 3 inches of water column (about 750 Pa), and in some aspects, less than or equal to about 1 inch of water column (about 250 Pa). In many cases, the pressure of the process exhaust stream 100 is near atmospheric pressure. In certain aspects, the pressure of the jet stream 114 is at least five times the amount of the first pressure of the effluent stream 100. In various aspects, the pressure of any flue gases recirculated to the reaction furnace 102 should be comparable to the pressure of the oxygen-containing gas stream 118 as it enters the reaction zone/burner (not shown) in the reaction furnace 102. As discussed previously, these are typically relatively high pressures, for example, greater than or equal to about 10 inches of water column (about 2.5 kPa), optionally greater than or equal to about 15 inches of water column (about 3.7 kPa), in some aspects greater than or equal to about 20 inches of water column (about 5 kPa), and optionally greater than or equal to about 25 inches of water column (about 6.2 kPa). The desired pressure for re-entry into the furnace 102 depends on various design parameters of the reaction zone, the reaction chamber, the burner, and fuel selection, as appreciated by those of skill in the art.

As the jet stream 114 passes through the nozzle injector 116 it enters the mixing chamber 110 at a high velocity. Based on the diameter and design of the injector nozzle 116 the high velocity jet 112 has an expansion half-angle that relates to the lateral spread dimensions (dimension labeled "d") of the high velocity jet 112 in an entrainment (e.g., mixing) zone 120 of the mixing chamber 110. The jet 112 entrainment length in combination with jet 112 velocity provides for design of different levels of entrainment of the passing effluent gas 100. As the high-velocity jet 112 travels into the mixing chamber 110, turbulent mixing entrains the effluent stream 100 to create a mixed stream 122 near the region designated (4). This mixed stream 122 has a high-temperature and a relatively high velocity. The total mass flow rate of the jet 112 increases (as it becomes mixed stream 122) while the injected momentum is conserved, as will be discussed in greater detail below.

In the entrainment zone 120, a mixed stream 122 is formed along the length of the jet stream 112 (dimension labeled "x") that is suitably diluted, has a reduced velocity, an increased mass and a high temperature. The mixed stream 122 is then pressurized. Pressurization can be achieved by passing the mixed stream 122 through a flow passage having a reduced diameter. For example, in FIG. 5, the mixed stream 122 passes into a collection duct 124 (for example, a flanged accumulating duct or venturi duct within the outlet duct work, which has a relatively small cross-sectional area that collects a large flow rate of mixed stream 122). The diameter of such a collection duct 124 is chosen based on the length of jet 112 (x) and the diameter of the nozzle 116. The mixed stream 122 has a sufficient velocity that upon passing through the collection duct or zone 124; the stream 122 is converted to a high pressure recirculation stream 126 suitable for recycling by delivering it to the burner in the reaction zone 102. Moreover, the high pressure recirculation stream 126 has a high temperature because enthalpy or heat is recovered from the passing effluent gas stream 100.

In certain aspects, make-up oxygen 130 may be delivered to the mixed stream 122 and/or high pressure stream 126 (if it is after the collection duct 124) from a source of oxygen 128. The high pressure recirculation stream 126 is recycled and recirculated back to the burner in the reaction furnace 102. While an appropriate amount of oxygen is added to the jet stream 114, if required, make-up oxygen 130 may optionally be used based on the concentration of oxygen present in the mixed stream 122, which can be determined by oxygen sensors within the system 108. This make-up oxygen system 130 can be combined with the oxygen-containing gas system 118 that delivers oxidant to the burner.

In some aspects, the amount of oxygen added from the oxygen source 128 can be reduced by adding more oxygen to the jet stream 114 which forms a part of the pressurized recirculated stream 126 recirculated to the reaction furnace 102. The amount of oxygen added to the recirculated stream 126 depends on the amount of dilution (the portion of effluent stream 100 present within the mixed stream 122), as well as considerations related to gas temperature and impact on various emissions, such as nitrogen oxide, whose formation is highly dependent upon temperature.

In an alternate aspect, both gaseous fuel and oxygen can be concurrently preheated via the effluent stream 100. Gaseous fuel, pre-vaporized liquid fuel, and/or liquid fuel spray can be created by an appropriate injector nozzle 116b, which is then preheated and mixed with the effluent gases 100 in a manner similar to the oxygen-enriched air described above. However, in certain aspects, the respective fuel and the oxygen systems for pre-heating/mixing are maintained separately from one another. The recirculated fuel and oxygen streams are subsequently mixed before or in the reaction zone of the furnace 102.

Figure 6:
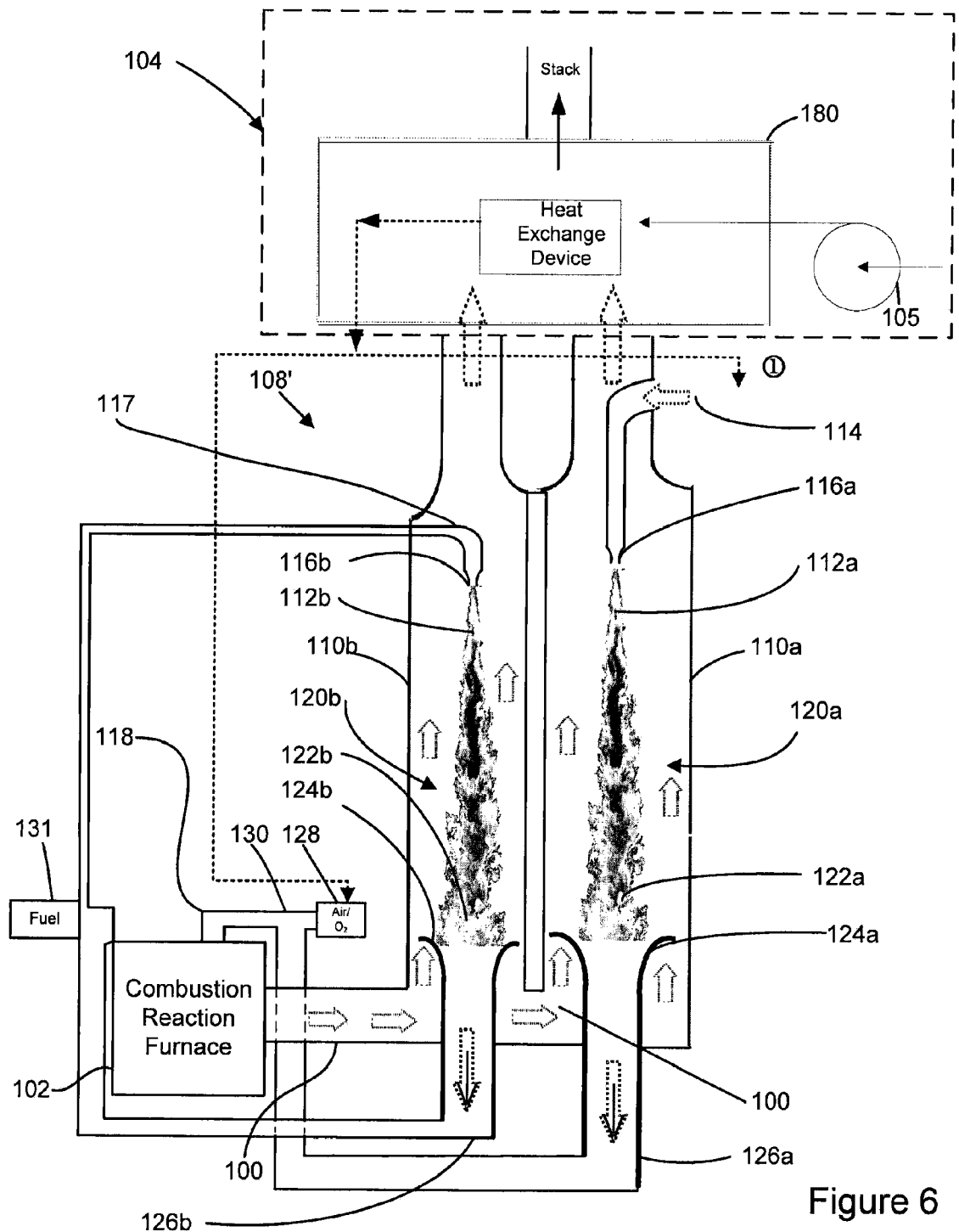
FIG. 6 is a schematic showing a combustion source with a heated exhaust gas and a bifurcated vertical heat recovery system (having an oxygen side and a separate fuel side) in accordance with one aspect of the principles of the disclosure, as well as an optional conventional recuperator for heat recovery.

Such an embodiment is shown in FIG. 6, for example. The heat recovery system 108' has two distinct mixing chambers 110a and 110b. A process effluent stream 100 is delivered to the first mixing chamber 110a and second mixing chamber 110b simultaneously. As appreciated by those of skill in the art, either mixing chamber 110a or 110b may be isolated and taken off-line, where its operation is independent of the other chamber's operation. Further, such a system also provides control over the relative flow of effluent stream 100 into 110a or 110b. Fuel contained in a fuel source 131 is directed to a second injection nozzle 116b via fuel stream 117, in a similar manner to oxygen/air from stream 114 to injection nozzle 116a. A first oxygen-containing jet 112a is formed in a first mixing zone 120a to form mixed stream 122a, in the same manner described above in the context of FIG. 5. Similarly, the fuel stream 117 is introduced to the other mixing chamber 110b after exiting injection nozzle 116b, thereby forming a gaseous fuel jet 112b which entrains passing heated effluent 100 in an entrainment/mixing zone 120b. The mixed fuel stream 122b is pressurized at 124b (as mixed oxygen-containing stream 122a is likewise pressurized at 124a to form pressurized stream 126a). Pressurized stream 126b is formed and circulated back to the furnace 102. Streams 126a and 126b are then combined at the reaction zone of the furnace 102. Additional fuel and/or oxygen may be added, as necessary. In this manner, both fuel and oxidant streams are preheated via entrainment with a portion of the effluent 100 prior to entering the furnace 102. The delivery of pre-heated fuel is particularly beneficial for furnace 102 operation and previously was not available due to the limitations of the heat recovery equipment. However, with the direct mixing provided by jets 112a and 112b, heating of both oxidant and fuel is feasible and in some aspects, highly desirable. This capability also enables different fuels to be used in the same burner.

It should also be noted that in embodiments where the process in the combustion source generates volatile organic compounds (VOCs) or other combustible products, the recirculation of the mixed stream 122 is particularly beneficial, as it delivers such VOCs to the burner for additional combustion, thus utilizing the fuel value of such byproducts and minimizing release of VOCs as emissions. In certain aspects, the effluent 100 having VOCs/fuel value may be directed to either chamber 110a or 110b, although at higher VOC concentrations, such an effluent stream is desirably isolated to a fuel-only chamber to maintain a mixed stream that has a fuel concentration above the upper flammability limit (UFL) concentration. For example, in aluminum recycling, a de-lacquering process removes the paint and finish from aluminum can products prior to melting. At least a portion of the organic compounds released during this process can then be recycled and burned in the burner, rather than being released to the atmosphere. Similarly, paint-ovens for industrial paint applications generate significant levels of VOCs, which can recycled into the combustion burner.

While not limiting, in certain aspects, the jet stream 114 has an oxygen concentration of about 20% to about 100% by weight, optionally about 23% to 100% by weight. In certain aspects, the jet stream 117 comprises fuel, ranging from 20% to about 100% by weight. As appreciated by those of skill in the art, the separate fuel and oxidizer jet streams 114, 117 may be adjusted to yield a stoichiometric, a lean, or a rich ratio of fuel to oxidant in the reaction furnace 102 depending on the desired conditions and the level of "make-up" reactants needed due to the composition of the incorporated effluent stream 100. In certain aspects, the jet stream (for example 114 of FIG. 5 or 6) comprises oxygen in substantially pure form (about 100% oxygen, notwithstanding certain impurities or diluents typically found in pure oxygen). Thus, in certain aspects, the thermal energy/enthalpy recovery method of the disclosure provides a recirculated effluent gas to the reaction chamber 102 that has a high-temperature (not requiring any additional heating) and a sufficiently high pressure as required by the burner.

In various aspects, the mixing chamber 110 (for simplicity referring to the embodiment shown in FIG. 5) is designed based on the flow rate of the process stream 100 and preferably has a volume designed to permit a residence time of the gases to interact and form the mixed high velocity stream 122 in the entrainment zone during operations. In typical manufacturing facilities, effluent or exhaust streams from various processes have flow rates ranging from about 10,000 actual ft$^3$/min (acfm) (about 285 m$^3$/min) to about 600,000 acfm (about 17,000 m$^3$/min). However, as appreciated by those of skill in the art, such flow rates vary widely based on the capacity of the facility and the type of process. For example, non-limiting representative boiler exhaust flow rates can range from about 100,000 acfm (about 2,800 m$^3$/min) to about 600,000 acfm (about 17,000 m$^3$/min).

A heat recovery system like 108 can be located in proximity to the combustion chamber 102 connected to existing duct work. The desired residence time of the effluent stream 100 depends upon the flow rates and the duct diameter, however in certain non-limiting examples, is greater than about 0.1 seconds, optionally greater than about 0.5 seconds, and optionally greater than about 1 second. In one exemplary and non-limiting aspect, a mixing chamber 110 can have a physical size of less than about 50 cubic meters, for example, a "foot print" of 10 m$^2$ and a height of about 5 m. Thus, for an exhaust flow rate of 6,000 m$^3$/min, the effluent gas velocity is 10 m/s and the residence time in the 5 m duct is 0.5 seconds.

Thus, the method comprises entraining a portion of the process stream 100 into the high velocity jet 112 to form a mixed stream 122. As described above, the high velocity jet 112 is formed by passing the second stream 114 at a high pressure through the injection nozzle 116, which converts the jet stream 114 to a high velocity jet stream 112. This air jet 112 expands at an expansion half-angle within the entrainment zone 120, thereby entraining and mixing the hot process gases of the effluent stream 100 into the jet 112. Non-limiting suitable expansion half-angles range from 10° to about 15°, optionally about 120, depending on the application. Thus, the turbulent flow and physics of the high velocity jet 112 entrains a mass of passing process effluent stream 100. In certain aspects, the injector nozzle 116 is selected to have a low coefficient of friction or a high discharge coefficient, for example, an efficiency of 0.95 is desirable. Such nozzles are well known in the art.

The amount of effluent gas 100 entrained in the high velocity jet 112 is dependent on the length (shown as x in FIG. 5) and momentum of the high velocity jet 112 (dependent on the injection nozzle 116 design and flow rate of the jet stream 114). The nozzle 116 diameter, upstream pressure, and exposed jet 112 length are all parameters well known to the skilled artisan that can be selected to form an appropriate high-velocity jet based upon the volumetric flow rate of the process stream. For example, such methods are disclosed in Ricou, et al., *J. Fluid Mech.* 11:21-32 (1961). Hill, *J. Fluid Mech.* 51:773-779 (1972); Broadwell, et al., *J. Fluid Mech.* 125:397-410 (1982); Dahm, et al., *AIAA J.* 25:1216-1223 (1987); Dowling, et al., *J. Fluid Mech.* 218:109-141 (1990); Broadwell, et al., *Combust. Flame,* 114:319-335 (1998); and Donghee, et al., *Combustion And Flame* 124:370-386 (2001); which are herein incorporated by reference in their respective entireties.

The mass flow rate of the jet ($\dot{m}_x$) at a point designated x along its length (distance measured from the virtual origin) is calculated by the simplified Equation 1.

$$\dot{m}_x = C_e \times \dot{m}_0 \times \frac{x}{d_0} \times \left(\frac{\rho_\infty}{\rho_0}\right)^{\frac{1}{2}} \quad \text{(Eqn. 1)}$$

where the entrainment coefficient $C_e$=0.32 for a fully developed nonreacting free turbulent jet, approximate conditions which are appropriate for the present application. Here $d_0$ is the jet diameter at the exit of the nozzle, $\dot{m}_0$ is the jet mass flow rate at the nozzle exit; $\rho_0$ and $\rho_\infty$ are the respective densities of the jet at the exit of the nozzle and the surrounding effluent gases that are being entrained. Both $\rho_0$ and $\rho_\infty$ can be determined by the ideal gas law given the temperature and the average molecular weight. In the example illustrated in FIG. 10, $\rho_\infty$ is 0.24 kg/m$^3$ and $\rho_0$, the density of the jet as it exits the injector nozzle 116 after point (2), has a value of 1.2 kg/m$^3$. Also, in Equation 1, $\dot{m}_0$ is the mass flow rate of the jet stream as it exits the injector nozzle 116. For the desired oxygen concentration and the temperature of reconstituted burner "air," the mass flow rate of the entrained hot gases and required oxygen are calculated by oxygen and energy balances. If the same total mass flow rate of "air" is maintained to the burner, then for the example illustrated in FIG. 10, the total mass flow rate is 9.19 kg/s, the required oxygen mass flow rate to maintain 21% concentration is 1.48 kg/s, the air mass flow rate is 2.8 kg/s and the mass of flue gases entrained is 4.91 kg/s. As appreciated by those of skill in the art, these values will have to be dynamically and iteratively controlled in an actual furnace. They are presented here for illustration purposes only and should not be construed as limiting the principles by which the present teachings operate. If air and an adequate amount of oxygen is injected into the nozzle 116, $\dot{m}_0$=(2.8+1.48) Kg/s. Thus, $\dot{m}_x$=0.32×4.28×0.447×x/$d_0$=0.6122×x/$d_0$. For $\dot{m}_x$=9.19 Kg/s, then $$\frac{x}{d_0} \approx 15.$$

With an approximate 12° jet expansion half-angle, the jet width at point (4) is: $d_4$=x×2×tan(12°). To find the velocity at point (4) a '$V_4$' momentum balance is required.

Applying the momentum equation to the control volume bounded by the horizontal planes at points (4) and (6) and the inner surface of the duct, a net pressure force in the upward direction is represented by P=ΔP×A. Where, ΔP=20 inches w.c. (4980 Pa), because the pressure in the surrounding exhaust plenum is nearly atmospheric. The collection duct 124 area is A=π($d_4^2$/4) m$^2$. The average gas velocity in the collection duct given that the duct carries 331.61 gmol/s of mixed stream 126 (having an average molecular weight of 27.71 g/mol). The mass flow rate of the recirculation stream 126 is thus 9.19 kg/s with a density of 0.338 kg/m$^3$ at 700° C. Thus, the volumetric flow rate of the recirculation stream is =9.19/0.338≈27 m$^3$/s and the velocity $V_4$=27/(π$d_4^2$/4). In this it is assumed that the necessary oxygen is added in stream 114 and only an insignificant amount is added to the collection duct 124. A momentum balance (Equation 2) now gives the average gas velocity $V_4$ at point (4) in FIG. 5.

$$\Delta P = \rho_4 V_4^2 + \rho_{O_2} V_{O_2}^2 - \rho_6 V_6^2 \quad \text{(Eqn. 2).}$$

As mentioned before, if the necessary oxygen is added in stream 114, $V_{O_2}$≈0. Here, $\rho_4$ and $\rho_6$ are the respective fluid densities at points (4) and (6) of FIG. 5; and $V_4$ and $V_6$ are the respective average gas velocities of the fluids at points (4) and (6). Assuming that $\rho_4$ equals $\rho_6$, as each stream has the same composition and temperature of 700° C., the pressure differential obtained is $\Delta P=4980$ Pa $=\rho_4(V_4^2-V_6^2)$ or $V_4^2=V_6^2+14734$.

One final momentum balance is between points (2) and (4). In between these points, while the mass increases by entrainment, the injected momentum is conserved, i.e., $\dot{m}_0 \cdot V_2 = \dot{m}_4 \cdot V_4$; where $\dot{m}_0 = \rho_0(\pi d_0^2/4) \cdot V_2$. At this point, it is advantageous to assume one quantity and calculate the rest to determine if these values fall within an acceptable range, and to iterate if these values are not acceptable.

Assuming that the injection velocity $V_2$ is 300 m/s, this gives $d_0=12.3$ cm or 4.84" (about 12.3 cm) which is an acceptable value. Given this $d_0$ value, x≈6 ft or 1.85 m, which is also acceptable for implementation. Further, $d_4=x \times 2 \times \tan(12°)$ $=0.78$ m; $V_4=\dot{m}_0 \cdot V_2/\dot{m}_4=140$ m/s and $V_6=69$ m/s. Finally, using conservation of mass, $d_4^2 \cdot \rho_4 \cdot V_4 = \rho_6 \cdot d_6^2 V_6$; with $\rho_4 \approx \rho_6$; $d_6=1.1$ m.

Thus, the jet velocity at the injector nozzle 116 is 300 m/s, the width of the jet 112 at point (2) (at the injector nozzle 116) is 4.84 inches and the length (x) of jet 112 is 6 feet.

The net savings generated in this embodiment is calculated by energy balance as: Energy Savings=(exhaust flow rate without recirculation−exhaust flow rate with recirculation)× $C_P \times (T_{exh}-T_{amb})$, where $T_{amb}$ is ambient temperature and $T_{exh}$ is the exhaust temperature after preheating the fuel and/or oxidizer.

Figure 7:
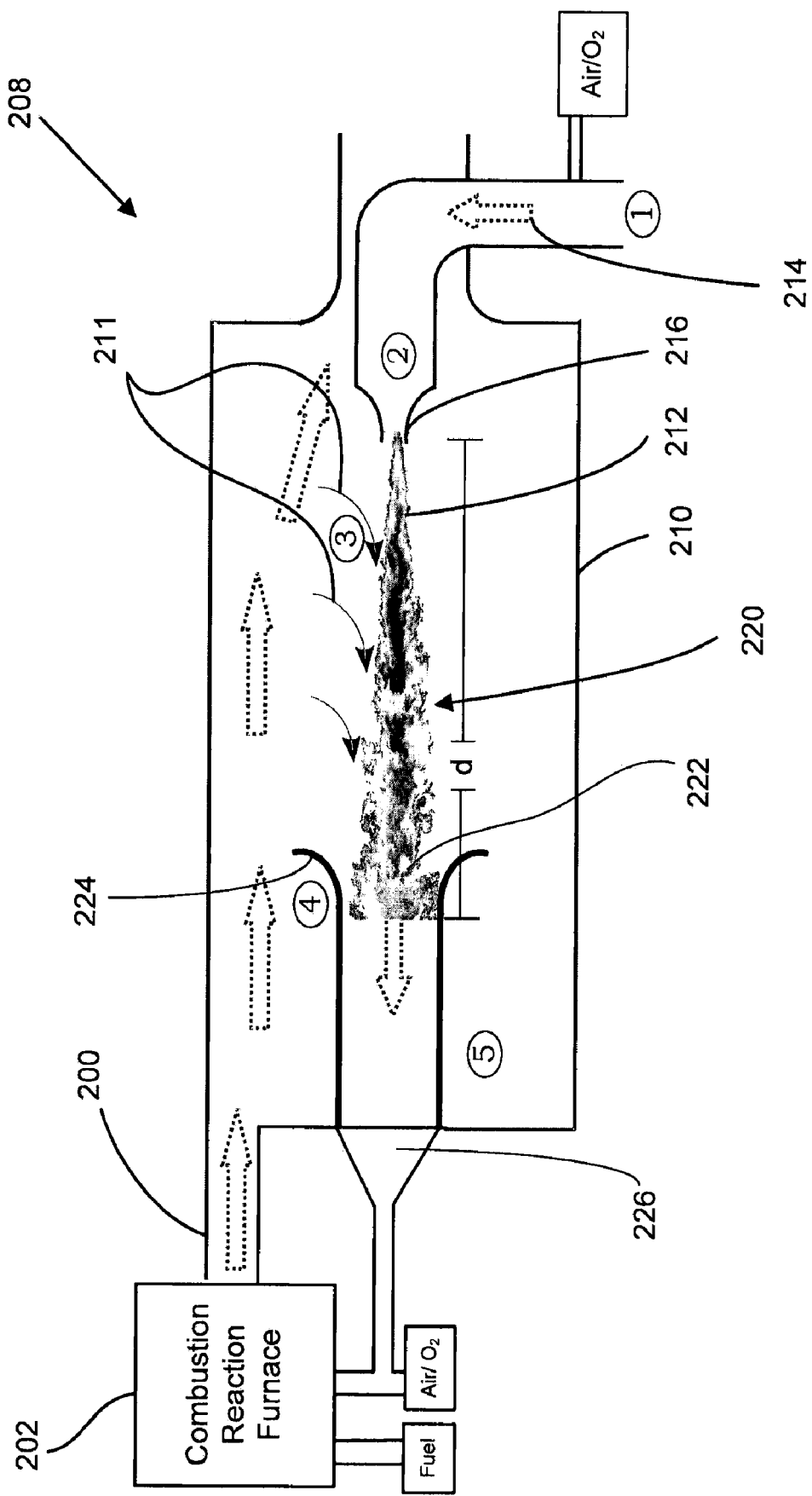
FIG. 7 is a partial schematic showing a combustion source with a heated exhaust gas and a horizontal heat recovery system in accordance with one aspect of the principles of the disclosure.

In another aspect, the present disclosure provides a heat recovery system 208 (FIG. 7), which is similar to that in FIG. 5, however a mixing chamber 210 is disposed in a horizontal rather than a vertical orientation. A jet stream 214 exits a nozzle injector 216 to enter the mixing chamber 210 at a high velocity, thus forming a high-velocity jet 212. The high-velocity jet 212 operates on the same principles described above, where momentum of the jet stream 114 and the expansion angle relate to the distance that the high velocity jet spreads laterally in the entrainment zone 220 of the mixing chamber 210. The amount of expansion of the jet 212 relates to the amount of effluent process stream 200 that is entrained therein. The expansion angle in combination with the jet 212 velocity provides far different levels of entrainment of the passing effluent gas 200. As the high-velocity jet 212 travels into the mixing chamber 210, turbulent mixing entrains the effluent stream 200 exiting the combustion reaction furnace 202 to create a mixed stream 222 near the region designated (4).

The mixed stream 222 is then pressurized by passing through a collector duct 224 (flow passage having a reduced diameter), such as a venturi-shaped duct. The high temperature mixed stream 222 is converted to a high pressure and high temperature recirculation stream 226 suitable for recycling by delivering it to the furnace 202 for combustion.

Thus, the present disclosure provides new methods for recycling process effluent, so called "flue gas recirculation" (FGR), which significantly reduces certain pollutants commonly formed in combustion, including nitrogen oxides ($NO_x$) and carbon monoxide (CO) emissions. In various aspects, a portion of the effluent stream is recycled or returned to the furnace as reactant. In certain aspects, the volume of the effluent process stream that is recirculated via the mixed stream and recirculated stream is greater than about 5 volume % and less than about 95 volume %; optionally from about 15 volume % to about 75 volume %; optionally about 20 volume % to about 50 volume %. In certain aspects, it is desirable to bleed or purge at least a portion of the effluent gases from the system to prevent accumulation of undesirable pollutants or components. In certain aspects, the amount of the effluent process stream that is recirculated to the furnace is greater than about 5 volume %; optionally greater than about 10 volume %; optionally greater than about 15 volume %; optionally greater than about 20 volume %. In certain aspects, at least a portion of the effluent gases is purged from the system to maintain steady state. The amount of effluent purged depends on the amount of oxygen used and may be further used to preheat fuel or the oxidizer by a heat exchanger.

In various aspects, the energy-savings benefits of the present teachings relate to the following two factors, among others: (i) recirculating at least a portion of the hot effluent gases back into the furnace, and (ii) reducing the mass of effluent gases generated. In certain aspects, the amount of effluent gases generated is further reduced by the use of substantially pure oxygen. In addition to these energy benefits, environmental benefits are realized by a reduction in one or more pollutants typically generated in a combustion source. For example, common air pollutants found in effluent streams from combustion sources, such as boilers, kilns, furnaces, and incinerators and the like, include carbon monoxide (CO), carbon dioxide ($CO_2$), hydrochloric acid (HCl), chlorofluorocarbons (CFCs), nitrous oxides ($NO_x$), sulfur oxides ($SO_x$), particulate matter (PM), volatile organic compounds (VOCs), aerosol compounds, mercury (Hg), lead (Pb), ammonia ($NH_3$), ozone, and mixtures and equivalents thereof. In various aspects, at least one or more such pollutants are reduced from a level of pollutants otherwise generated in a comparative combustion reaction not having the high velocity jet and the recirculated mixed stream of the present teachings.

Furthermore, the methods of the present disclosure improve combustion technologies by providing a more thermally efficient heat distribution that increases productivity of the furnace or burner. In typical modes of combustion, for example, where a visible flame is present, the fuel tends to be physically separated by one or more interface boundaries from the oxidant. As such, when the oxidant reacts with fuel at the interface, localized bursts of heat and light are generated, resulting in a visual flame profile and a higher temperature flame. Reaction in such a traditional combustion mode provides convective, conductive, and some radiative heat transfer.

However, in accordance with certain aspects of the present disclosure, combustion is conducted in a mode generally referred to as "homogeneous combustion," also referred to as low-gradient combustion or radiative homogenous combustion (RHC). In homogenous combustion mode, the fuel and oxidant are pre-mixed and then mixed prior to reaction and undergo even reaction at lower peak temperatures with substantially all heat transfer being in the ideal desirable radiative mode (the most efficient heat transfer from high temperature, large volume reacting gas). Thus, energy is transferred from the reaction zone at a high rate via intense and uniform radiation, which further reduces the temperature in the reaction zone. In such a combustion mode, the fuel and oxidant are typically highly preheated and are present at significantly lower concentrations due to mixing with flue gases. Both of these conditions are provided by the methods of the present disclosure. In industrial combustion sources, RHC operation provides significant energy savings and pollutant emission reductions. Examples of homogenous combustion (RHC) modes include Flameless Oxidation (FLOX), High Temperature Air Combustion (HiTAC), and low temperature gradient (MILD) combustion, all known to those of skill in the art.

Suitable conditions for achieving these homogenous combustion conditions are: (i) oxidant and fuel mixture temperatures that are above the auto-ignition temperature of the fuel (for example, about 1700° F. (about 1200 K) for methane), and (ii) fuel and oxidant are sufficiently diluted by flue gases before they react. Both of these conditions for homogenous combustion can be achieved by high recirculation of hot effluent products by entrainment in a jet stream, in accordance with the present disclosure. Thus, the present disclosure provides methods of recovering enthalpy from high-temperature waste streams and substantially diluting the oxidizer and fuel with hot effluent gases by the heat recovery systems described above. In addition, through the use of oxygen-enriched air (as the oxidant in the furnace), further efficiency gains are obtained due to the reduction in the mass flow rate of exhaust gases. Homogeneous radiative combustion provides enhanced emissivity of combustion gases at a reduced peak temperature, thus increasing the productivity of the combustion source due to better energy transfer via radiation.

The recirculation process of the present disclosure reduces the peak combustion temperature and lowers the percentage of oxygen and/or nitrogen in the combustion air/effluent gas mixture; thus reducing the formation of CO and $NO_x$, for example, which are caused by high flame temperatures. In this regard, various aspects of the disclosure provide methods for reducing the formation of pollutants, such as CO and/or $NO_x$, while significantly improving thermal recovery. In certain aspects, the $NO_x$ formation is reduced by up to at least 60% when the effluent process stream is recirculated in accordance with the present disclosure over a comparative combustion source (for example, an industrial furnace) that does not recirculate a portion of the flue gas in the manner described in this disclosure.

Figure 8:
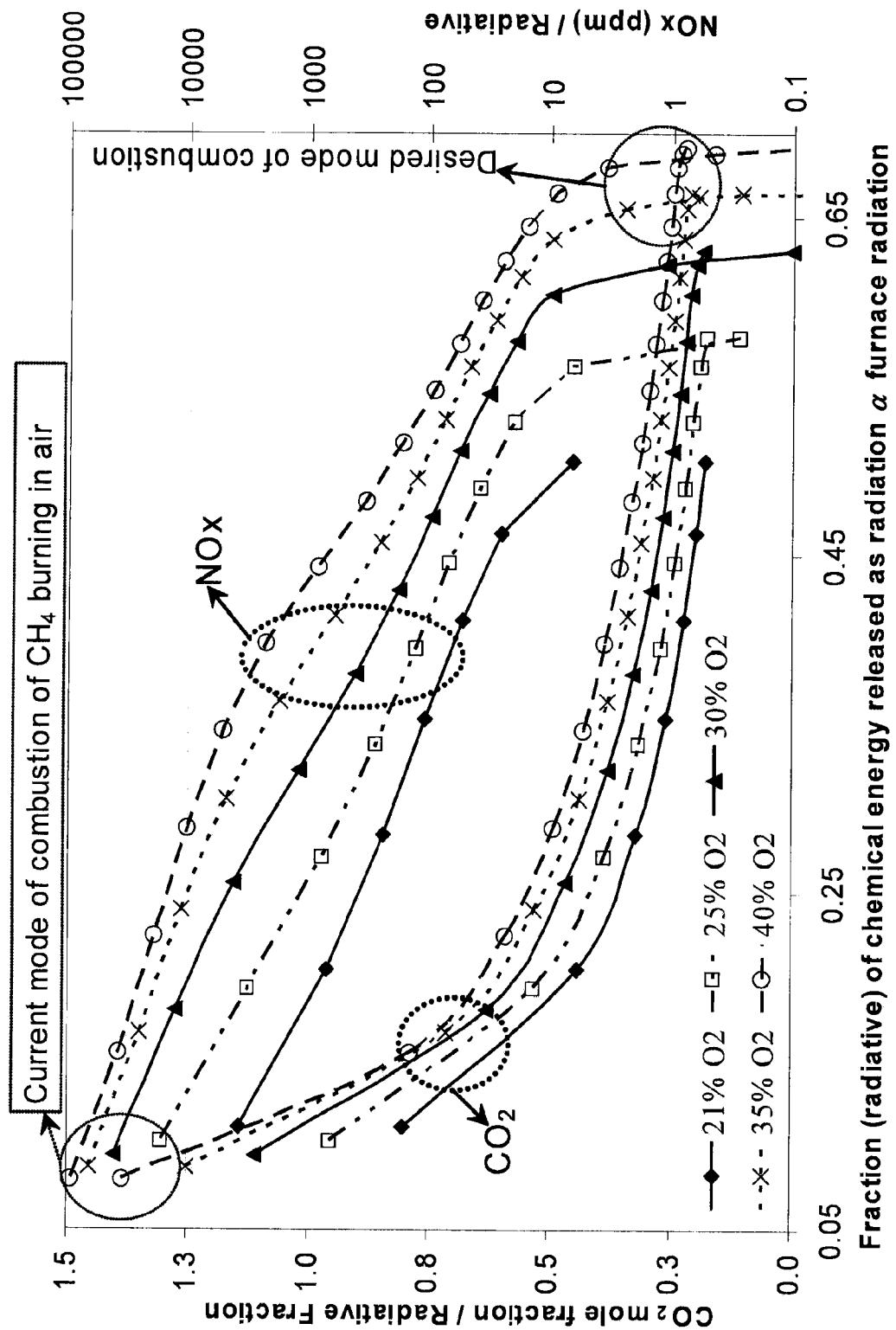
FIG. 8 is a plot of estimated $CO_2$ mole fraction/heat loss ratio versus heat loss ratio calculated by GRI Mech 3.0 software with a viscous dissipation function ($\phi$) of 1.0 and a residence time (T) of 0.5 seconds, where oxygen is reacted with methane at various concentrations ranging from 21% $O_2$ (concentration of oxygen in air) to 40% $O_2$.

FIG. 8 shows the benefits of highly radiative combustion. The amount of methane fuel to the combustion source is maintained at a constant value, and the oxygen is varied to show performance with different levels of oxygen enrichment. Combustion with air is shown at 21% oxygen and the heat loss ratio is lower and less desirable for current conventional modes of combustion (non-radiative combustion) in the upper left corner. As the combustion shifts to primarily radiative, CO, $NO_x$, and $CO_2$ formation per unit furnace productivity is reduced. The abscissa of FIG. 8 is the fraction of chemical energy released as flame radiation and the two ordinates are $CO_2$ and NO produced per unit flame radiation. Assuming that the amount of radiation released is proportional to furnace productivity, $CO_2$ and NO production rates decrease substantially ($CO_2$ by a factor of five and NO by five orders of magnitude) for the same productivity and the same fuel consumption as the radiative fraction increases. The normal flame condition for $CH_4$ combustion is shown in this Figure by the shaded circle in the top left hand corner and the desired flame condition is shown by the shaded circle in the bottom right hand corner. FIG. 8 emphasizes the importance of homogeneous combustion and flame radiation in industrial furnaces to reduce both $NO_x$ and greenhouse gases. These pollutant formation and productivity benefits are in addition to the energy efficiency benefits.

It is important to note that the exhaust flow rate reduces substantially when the combustion source is operated with $O_2$ enrichment (where oxygen is increased over the concentration present in air), hence the size of downstream equipment can be reduced, thus making the entire capital investment required for such a system less expensive. Further, as the degree of preheat of oxygen and/or fuel entering the combustion source increases, energy efficiency is increased, reaction zone temperature is reduced because of dilution, and the $O_2$% necessary is reduced. For example, preheating the combustion oxidant and/or fuel and using $O_2$ enrichment (for example 100% pure $O_2$) provides significant fuel savings.

Thus, the present teachings provide a method of combustion in a highly radiative homogenous combustion mode that increases flame radiation. The benefits of such increased flame radiation include decreased $NO_x$ formation; decreased NO by five orders of magnitude for the same fuel use, decreased $CO_2$ production by a factor of 5. Furthermore, in certain aspects, the increased flame radiation provides increased productivity for the same fuel consumption, where fuel preheating and slightly rich conditions further increase flame radiation through soot formation, while further reducing $NO_x$ formation.

In various aspects, a method of recovering enthalpy from a combustion source is provided by the disclosure. The method includes entraining at least a portion of a heated effluent stream in a high velocity jet stream to form a mixed stream. The heated effluent stream is created by reacting oxygen and a fuel in a reaction zone of the combustion source. The high velocity jet comprises oxygen and/or fuel. In certain aspects, the reaction is conducted in the reaction zone with substantially pure oxygen and fuel. The method further includes pressurizing the mixed stream and introducing the pressurized mixed stream into the reaction zone to recirculate at least a portion of the heated effluent stream. In certain aspects, the pressurizing comprises passing the mixed stream through a flow passage having a reduced diameter, for example, a venturi-shaped flow passage. In certain aspects, the pressurizing increases a pressure of the mixed stream to at least five times the pressure of the heated effluent stream when exiting the reaction zone. Thus at least a portion of the enthalpy contained in the heated effluent stream is recovered.

In certain aspects, the portion of the enthalpy recovered from the heated effluent stream is at least 50%. In certain aspects, the reacting of the oxygen and the fuel is done at a first pressure and the pressurizing increases a pressure of the mixed stream to a level comparable to the first pressure. Also, in yet other aspects, the reacting of oxygen and fuel is conducted in a radiative homogenous combustion mode. In various aspects, 50% of the volume of the heated effluent stream is entrained by the high velocity jet to form the mixed stream. In certain aspects, at least a portion of the high velocity jet stream is pre-heated by a recuperator and/or regenerator.

The present disclosure further provides a method of improving energy efficiency of a combustion source, where the method includes entraining a heated effluent stream formed in a combustion reaction zone in a high velocity oxygen-containing jet to form a pressurized mixed stream. At least a portion of the mixed stream is returned to the combustion reaction zone.

In yet another aspect, the present disclosure provides a method of recovering thermal energy including providing a process effluent stream having a first temperature and a first pressure. The process effluent stream is formed in a combustion source. A high velocity jet is created in a device downstream from and in fluid communication with the combustion chamber. The high velocity jet entrains a portion of the process effluent stream into the high velocity jet to form a mixed stream. At least a portion of the mixed stream is passed through a collection duct that increases pressure of the mixed stream, so that the mixed stream has a second temperature and a second pressure and is delivered to the combustion source. The first temperature is greater than the second temperature. Further, in certain aspects, the temperature is at least about 500° F. (about 260° C.), and the second pressure is at least five times that of the first pressure. Optionally, the first temperature is greater than or equal to about 1,000° F. (about 540° C.) and the temperature of the high velocity jet is optionally ambient. In certain aspects, the first pressure is less than or equal to about 1 inch of water column (about 250 Pa). In certain aspects, the velocity of the high velocity jet stream is about 50 m/s to about 350 m/s. Optionally, the high velocity jet stream has a pressure of greater than or equal to about 20 inches water column (about 5 kPa) prior to passing through an injection nozzle. In certain aspects, the pressure of the mixed stream is greater than or equal to 20 inches water column (about 5 kPa).

In various aspects, the energy recovery device of the present disclosure does not require any significant modification to the burners in the reaction zone or to the recuperation/downstream process equipment. The installation of the heat recovery system requires minimal capital investment to recover thermal energy typically created by various combustion processes. While not limiting to the present disclosure, it is believed that the present process and systems provide for recovery of at least 50% of the enthalpy typically lost via exhaust/flue gas streams from a combustion source, while providing a self-cleaning and trouble-free operation for the heat recovery system having a reduced capital investment for installation. In certain aspects, the enthalpy recovered from the effluent streams is greater than or equal to about 55%; optionally greater than or equal to about 60%; optionally greater than or equal to about 65%; optionally greater than or equal to about 70%; and in some aspects greater than or equal to about 75% enthalpy recovery. The % of enthalpy utilized is calculated by the following Equations 3 and 4:

$$\% \text{ Enthalpy Utilized} = \frac{\left(\begin{array}{c}\text{Combustion Heat Input} - \\ \text{Heat Carried Away by Effluent/Flue Gas}\end{array}\right)}{\text{Combustion Heat Input}} \quad (\text{Eqn. 3})$$

expressed in another way is $$\% \text{ Enthalpy Utilized} = \frac{(\dot{m}_{fuel} \times \text{heat of combustion}) - (\dot{m}_{exh} \times \overline{C}_p \times (T_{exh} - T_\infty))}{(\dot{m}_{fuel} \times \text{heat of combustion})}, \quad (\text{Eqn. 4})$$

where $\dot{m}_{fuel}$ is the flow rate of fuel into the combustion source, $\dot{m}_{exh}$ is the flow rate of effluent, heat of combustion (or $\Delta H_c$) is for the oxidant and fuel reaction, $\overline{C}_p$ is the average heat capacity of the effluent gases, and $T_{exh}$ and $T_\infty$ reflect the respective temperature differentials of the effluent gas as it exits the flue/stack into the external environment. The present teachings reduce both $\dot{m}_{exh}$ and $T_{exh}$ to increase the amount of enthalpy recovered from the combustion source.

In certain aspects, the principles of the disclosure are well-suited for metal manufacturing and processing. By way of non-limiting example, the processes and systems described herein are used in conjunction with molten metal furnaces of the aluminum industry, which will be described in more detail below for illustrative purposes. A large capacity aluminum furnace has a charge capacity of 100-150 tonnes (200,000 to 300,000 lbs) of aluminum, and requires approximately 20 million kilocalories/hr (80-90 million BTU/hr) of energy input. On large furnaces, the melt rate is up to 3 metric tons per hour (80,000 lb/hr). A typical large aluminum processing complex may have 3 to 5 furnaces of this size and up to 10 of approximately half this size.

Volumetric flow rate of stack gases for an aluminum melting complex is estimated to be on the order of 25 million standard cubic meters (900 million standard cubic feet) per hour; where a temperature of the exhaust gases is on the order of 1000 to 1200° C. (about 1800 to about 2200° F.). A typical flow rate from such a facility is on the order of 125 million cubic meters (4.4 billion cubic feet) per hour.

Figure 9:
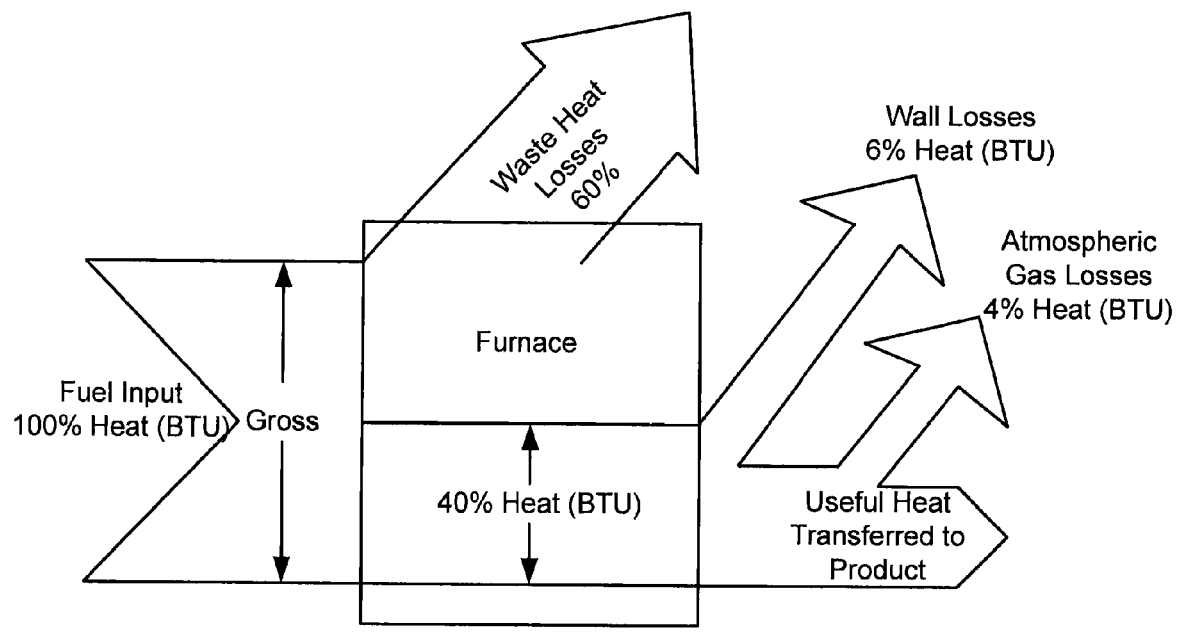
FIG. 9 is an exemplary energy balance for an aluminum melting furnace operation.

Significantly higher temperatures than the melting temperature of aluminum (about 650° C. or about 1200° F.), and significantly higher heat input than that required for melting aluminum (260 kilocalorie/kg or 460 BTU/lb of aluminum) are currently used. These are a result of the objective to melt the metal as rapidly as possible—by radiation of heat from furnace walls to the metal, which has low emissivity. FIG. 9 shows an estimated breakdown of current distribution of the thermal energy in an aluminum manufacturing system, where it is estimated that about 70% of the heat input to the system is lost and only 30% is transferred to the aluminum product.

Furnaces without any exhaust gas heat recovery system currently need an energy input of 1000 to 1025 kilocalorie/kg (1800 BTU/lb) of aluminum, but can require considerably more energy—over 1700 kilocalorie/kg (3000 BTU/lb)—if the burners are not adequately maintained. Many aluminum furnaces are of the batch type. Typical duty cycle of a batch furnace varies between 4 to 12 hours. Representative exhaust gas temperatures typically cycle in the range of about 500° F. (about 260° C.) to about 2100° F. (about 1150° C.) during furnace operation.

In conventional exhaust gas heat recovery technologies, such as conventional regenerative burners and recuperative heat exchangers, incoming ambient combustion air is heated to approximately 500° C. (900° F.) utilizing beds of ceramic balls in the case of regenerator burners and shell and tube heat exchangers in the case of recuperators. An additional form of heat recovery used with relatively small furnaces is a process known as load recuperation, where hot exhaust gas is used to preheat incoming material prior to charging the furnace. However, it has been observed that efficiency gains from these technologies, as measured by the ratio of useful heat to the product to the purchased fuel input, is modest—typically increases from about 30 to 40%. Further, such systems are quite expensive to install, expensive to maintain, and further, have a short equipment lifetime (for example, 1 to 2 years), largely due to corrosion and the build-up of salt fluxes used in the aluminum melting operation. A small amount of salt fluxes, for example, magnesium chloride ($MgCl_2$) and potassium chloride (KCl), are introduced into the molten metal bath in order to reduce alkaline elements; however, these salts are volatile, and they cause corrosion and build-up problems. Several days of furnace downtime is needed to replace failed systems. Retrofitting regenerator/recuperator systems to an existing furnace can require the furnace to be out of operation for several weeks.

Use of an air damper for pressure control in the furnace, for example, located in the stack about 3 meters (about 10 feet) above the furnace,—tends to cool the exhaust gases over 100° C. Compressed air is optionally fed in at 5 to 6 bars (80-90 psig) to create a positive pressure of 0.5 to 1 millibar (½ to 1 inch of water) in the furnace. The air break is utilized to cool the stack gas and allow use of lower cost refractories in the upper stack.

Figure 10:
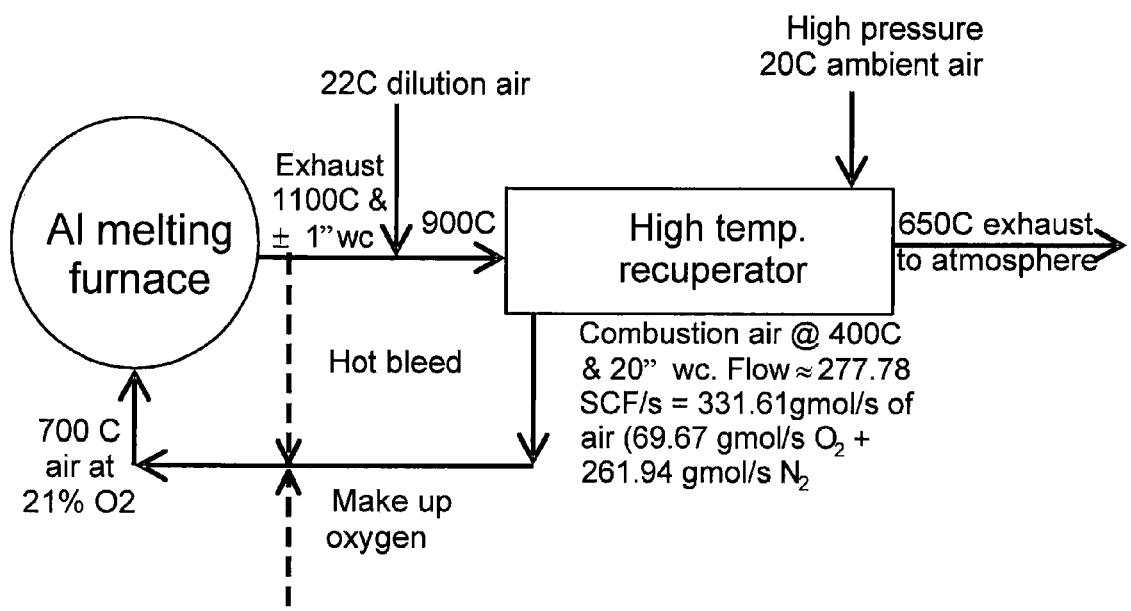
FIG. 10 is a schematic example of a heat recovery system for an exemplary aluminum melting furnace.

As shown in FIG. 10, an exemplary heat recovery system is conceptually demonstrated. A furnace exhaust (effluent process stream) has a temperature of about 1100° C. and a pressure close to atmospheric. Typically the pressure ranges from +1 inches wc (water column) to −1 inches wc. (As used herein, the pressure is assumed to be 0 inches wc or atmospheric pressure in this example). Since this exhaust is generally too hot to go to the high temperature recuperator, it is diluted by room air to reduce the temperature to 900° C. Assuming about 9% excess air, the fuel flow rate of ($CH_4$) is about 32 gmol/s. This yields 363.61 gmol/s of exhaust stream with only 1.56% $O_2$. The number of moles in the reaction of Equation 5 below is conserved and thus is set forth in gram moles.

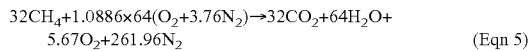
(Eqn 5)

The amount of hot bleed required to produce a flow rate M of reconstituted air from the recuperator (here M=331.61 gmol/s of reconstituted "air" at 700° C.) is set forth below in Equation 6, which is an oxygen balance equation $$0.21 \times \left[X\left(\frac{gmol}{s}\right) + Y\left(\frac{gmol}{s}\right)\right] = 0.156 \times X + Y \quad \text{(Eqn. 6)}$$

where X is the mass flow rate of the bleed or dilution air and Y is the mass flow rate of oxygen added to the system which can also be expressed as Equation 7 or:

$$Y\left(\frac{gmol}{s} O_2 \text{ added}\right) = 0.241 \times X\left(\frac{gmol}{s} \text{ of bleed}\right). \quad \text{(Eqn. 7)}$$

In Equation 8, an energy balance of the system is provided.

$$X \times 42.74\left(\frac{J}{gmol \cdot K}\right) \times (T_{Effluent} - T_{Inlet}) = \quad \text{(Eqn. 8)}$$
$$Y \times 33 \times (T_{Inlet} - T_{Dilution}) +$$
$$(M - X - Y) \times 33 \times (T_{Inlet} - T_{Dilution})$$

where X, Y, and M are the same flow rates as above, the $T_{effluent}$ temperature is 1100° C.; $T_{inlet}$ is the inlet temperature into the furnace, here 700° C., and $T_{dilution}$ is the temperature of dilution air, here 20° C.; which leads to X×42.74(J/gmolK)×(1100×700)=Y×33×(700–20)+(331.61–X–Y)×33×(700–400). This equation is solved to find that the flow rate of oxygen bleed (X) is 137.305 gmol/s; the flow rate of oxygen added is (Y) 33.79 gmol/s; and the flow rate of air is 160.515 gmol/s. Thus, the energy savings on such a system if a recuperator is used is calculated by Equation 9:

$$X \times 42.74\left(\frac{J}{gmol \cdot K}\right) \times (T_{Exit} - T_{Dilution}) = \quad \text{(Eqn. 9)}$$

Energy Savings with Recuperator which amounts to 137.305×42.74×(650–20)=3697.09 KJ/s=12.615 MMBtu/hour. At $10/MMBtu, this represents $126.15/hr. The energy savings in a system without a recuperator is calculated by Equation 9 above, by X×42.74(J/gmolK)×(1100–700)=(331.61–X)×33×(700–20), which results in X=188.217 gmol/s; Y=46.3 gmol/s. Thus, 188.217× 42.74×(1100–20)=8687.92 KJ/s=8234.559 BTU/s=29.64 MMBtu/hour. At $10/MMBtu, this represents $296.44/hr savings in an aluminum melting furnace.

The energy recovery methods and systems according to the present disclosure provide improved combustion by enabling operation in a homogenous combustion mode that enhances furnace productivity, increases radiative heat transfer, reduces fuel consumption, reduces pollution, thus reduces energy costs and global warming.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of recovering enthalpy from a combustion source, the method comprising:
reacting oxygen and a fuel in a direct-fire combustion reaction zone of a furnace to generate a heated effluent stream that exits the furnace;
entraining at least a portion of said heated effluent stream in a high velocity jet stream to form a mixed stream, wherein said entraining occurs external to said direct-fire combustion reaction zone of said furnace, and said high velocity jet stream comprises oxygen or fuel;
pressurizing said mixed stream; and
introducing said pressurized mixed stream into said direct-fire combustion reaction zone of said furnace to recirculate at least a portion of the heated effluent stream, thereby recovering at least a portion of the enthalpy contained in said heated effluent stream, wherein said introducing of said pressurized mixed stream into said direct-fire combustion reaction zone results in a radiative homogenous combustion mode with flameless combustion of said oxygen and said fuel in said direct-fire combustion reaction zone.

2. The method of claim 1, wherein said portion of the enthalpy is at least 50% of the enthalpy of said heated effluent stream.

3. The method of claim 1, wherein said pressurizing comprises passing said mixed stream through a venturi-shaped flow passage having a reduced diameter.

4. The method of claim 1, wherein said pressurizing increases a pressure of the mixed stream to at least five times the pressure of said heated effluent stream when exiting said reaction zone.

5. The method of claim 1, wherein the reacting of the oxygen and the fuel is done at a first pressure and said pressurizing increases a pressure of said mixed stream to a level greater than or equal to said first pressure and said pressurized mixed stream introduced into said direct-fire combustion reaction zone of said furnace raises a temperature of the reacting oxygen and fuel to above an auto-ignition temperature of the fuel.

6. The method of claim 1, wherein said high velocity jet stream comprises oxygen.

7. The method of claim 6, wherein said oxygen for said reacting and said oxygen of said high velocity jet stream are substantially pure oxygen.

8. The method of claim 1, wherein said high velocity jet stream is a first jet stream that comprises oxygen and said mixed stream is a first mixed stream, wherein said method further comprises entraining at least a portion of said heated effluent stream in a second high velocity jet stream that comprises fuel and that forms a second mixed stream which undergoes said pressurizing and is then introduced to said direct-fire combustion reaction zone where it is mixed with said first mixed stream comprising oxygen.

9. The method of claim 1, wherein one or more pollutants are reduced from a level of pollutants otherwise generated in a comparative combustion reaction not having the high velocity jet stream and the recirculated mixed stream.

10. The method of claim 1, wherein a second stream comprising oxygen is introduced into said pressurized mixed stream prior to said introducing to said direct-fire combustion reaction zone.

11. The method of claim 1, wherein said portion of said heated effluent stream entrained in the mixed stream by the high velocity jet stream and introduced into said direct-fire combustion reaction zone of said furnace is at least 50% of the volume of the effluent stream that exits said furnace.

12. The method of claim 1, wherein a mass flow rate of said high velocity jet stream is expressed by $$\dot{m}_x = C_e \times \dot{m}_0 \times \frac{x}{d_0} \times \left(\frac{\rho_\infty}{\rho_0}\right)^{\frac{1}{2}},$$

where $C_e$ is a coefficient of expansion, $\dot{m}_x$ is the mass flow rate at distance x measured from the virtual origin of a nozzle, $d_0$ is the jet diameter at the exit of the nozzle, $\dot{m}_0$ is the jet mass flow rate at the nozzle exit; $\rho_0$ and $\rho_\infty$ are the respective densities of the jet at the exit of the nozzle and at a distance x from the nozzle.

13. The method of claim 1, wherein said high velocity jet stream has a jet expansion half-angle of 10° to 15°.

14. The method of claim 13, wherein said high velocity jet stream has a jet expansion half-angle of 12°.

15. The method of claim 1, wherein at least a portion of said high velocity jet stream is pre-heated by a recuperator and/or regenerator.

16. A method of improving energy efficiency of a combustion source, the method comprising:
reacting oxygen and a fuel in a direct-fire combustion reaction zone of a furnace to generate a heated effluent stream having a flow rate ranging from greater than or equal to about 10,000 actual ft³/min (about 285 m³/min) to about 600,000 acfm (about 17,000 m³/min) that exits the furnace;
entraining greater than or equal to about 50 vol. % of said heated effluent stream formed in said direct-fire combustion reaction zone in a high velocity oxygen-containing jet to form a pressurized mixed stream in a mixing chamber having a volume permitting a residence time of at least 0.1 seconds for said heated effluent stream external to said direct-fire combustion reaction zone of said furnace; and
returning said mixed stream to said direct-fire combustion reaction zone of said furnace by introducing said mixed stream into said direct-fire combustion reaction zone.

17. The method of claim 16, wherein said high velocity oxygen-containing jet comprises substantially pure oxygen.

18. A method of recovering thermal energy comprising:
providing a process effluent stream having a first temperature and a first pressure, wherein said process effluent stream is formed by reacting oxygen and a fuel in a direct-fire combustion source;
creating a high velocity jet in a mixing chamber downstream from and in fluid communication with said direct-fire combustion source that entrains a portion of said process effluent stream into said high velocity jet to form a mixed stream, wherein said mixing chamber has a volume permitting a residence time of at least 0.1 seconds for said process effluent stream; and
passing at least a portion of said mixed stream through a collection duct that increases pressure of the mixed stream, so that the mixed stream has a second temperature and a second pressure and is delivered to said direct-fire combustion source, wherein said first temperature is greater than said second temperature and said first temperature is at least about 500° F. (about 260° C.), and said second pressure is at least five times said first pressure.

19. The method of claim 18, wherein said high velocity jet comprises oxygen or a fuel.

20. The method of claim 18, wherein said first pressure is less than or equal to 1 inch of water column (about 250 Pa) and said second pressure of the mixed stream is greater than or equal to about 20 inches of water column (about 5 kPa).

21. A method of recovering enthalpy from a combustion source, the method comprising:
reacting oxidant and fuel in a direct-fire combustion reaction zone of a furnace to generate a heated effluent stream that exits the furnace;
entraining at least a portion of the heated effluent stream in a high velocity jet stream to form a mixed stream external to said direct-fire combustion reaction zone, wherein said high velocity jet comprises fuel;
pressurizing said mixed stream; and
introducing said pressurized mixed stream into said direct-fire combustion reaction zone to recirculate at least a portion of the heated effluent stream, thereby recovering at least a portion of the enthalpy contained in said heated effluent stream, wherein said introducing of said pressurized mixed stream into said direct-fire combustion reaction zone results in a temperature of said pressurized mixed stream being above an auto-ignition temperature for the fuel to result in a radiative homogenous combustion mode in said direct-fire combustion reaction zone of the furnace.

22. The method of claim 21, wherein said radiative homogenous combustion mode results in flameless combustion of said oxygen and said fuel in said direct-fire combustion reaction zone of said furnace.

23. The method of claim 21, wherein said high velocity jet stream is a first jet stream that comprises fuel and said pressurized mixed stream is a first mixed stream, wherein the method further comprises entraining at least a portion of said heated effluent stream in a second high velocity jet stream that comprises oxygen and that forms a second mixed stream which undergoes said pressurizing and is then introduced to said direct-fire combustion reaction zone where it is mixed with said first mixed stream comprising fuel.

* * * * *

UNITED STATES PATENT AND TRADEMARK OFFICE
CERTIFICATE OF CORRECTION

PATENT NO. : 8,317,510 B2  
APPLICATION NO. : 11/776883  
DATED : November 27, 2012  
INVENTOR(S) : Arvind Atreya Page 1 of 1

It is certified that error appears in the above-identified patent and that said Letters Patent is hereby corrected as shown below:

In the Specifications:

Column 11, line 41, "120" should be --12°--.

Column 13, line 16, after "·$d_6^2$" insert --·--.

Column 19, line 22, "(1100×700)" should be --(1100-700)--.

Signed and Sealed this  
Second Day of July, 2013

Teresa Stanek Rea  
*Acting Director of the United States Patent and Trademark Office*

UNITED STATES PATENT AND TRADEMARK OFFICE
CERTIFICATE OF CORRECTION

Page 1 of 1

PATENT NO. : 8,317,510 B2
APPLICATION NO. : 11/776883
DATED : November 27, 2012
INVENTOR(S) : Atreya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this
Eleventh Day of November, 2014

Michelle K. Lee
*Deputy Director of the United States Patent and Trademark Office*